May 16, 1933. H. PARKER 1,909,888
MECHANISM FOR MEASURING AND COUNTING TUBES OR THE LIKE
Filed Aug. 10, 1929 15 Sheets-Sheet 1
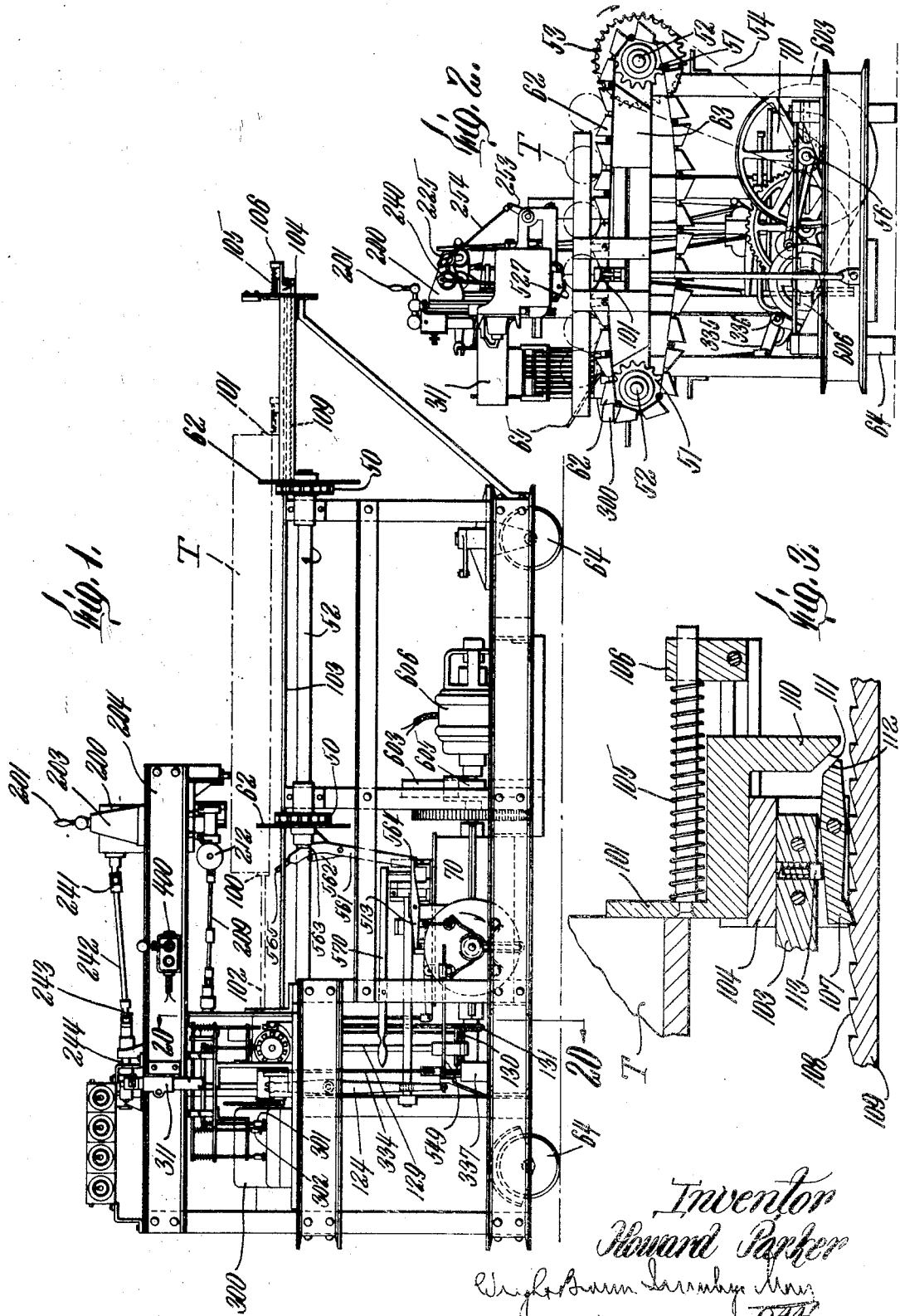

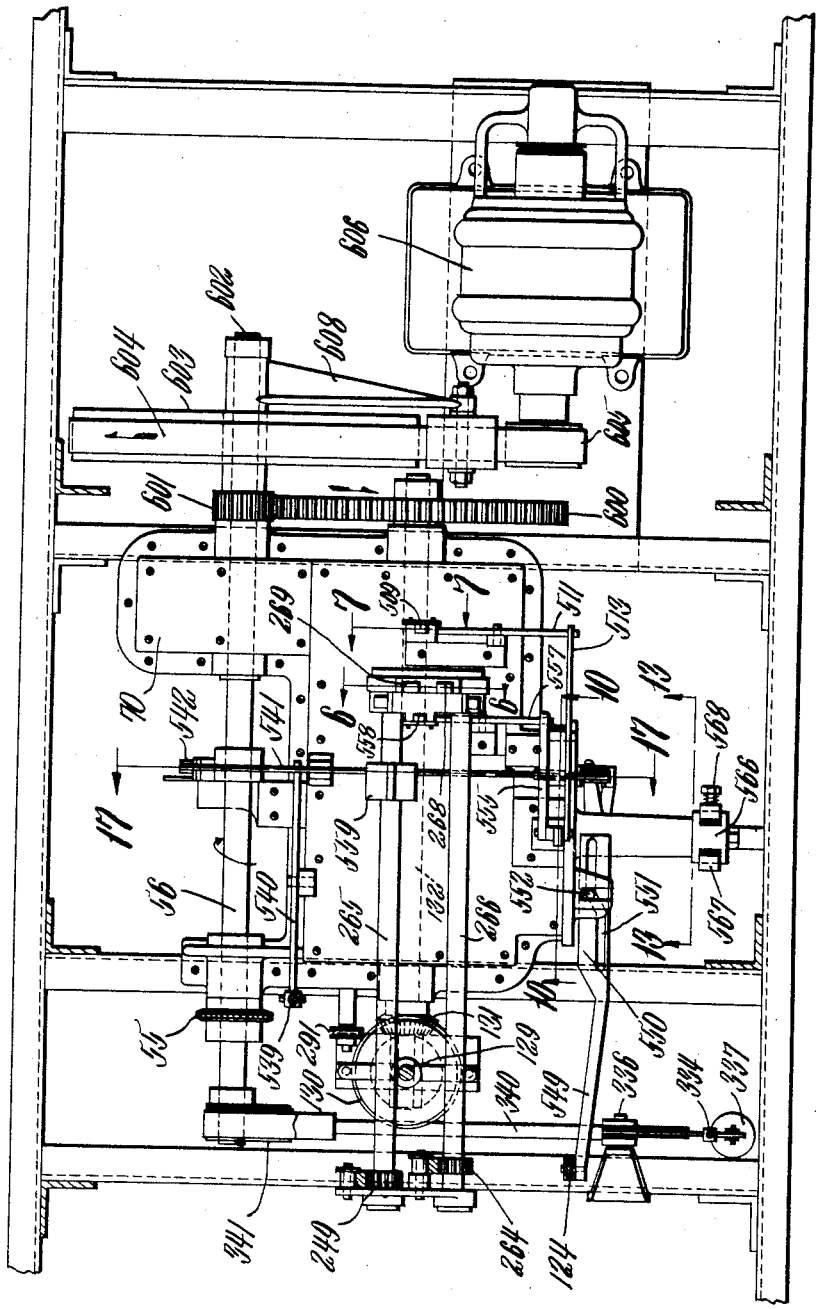

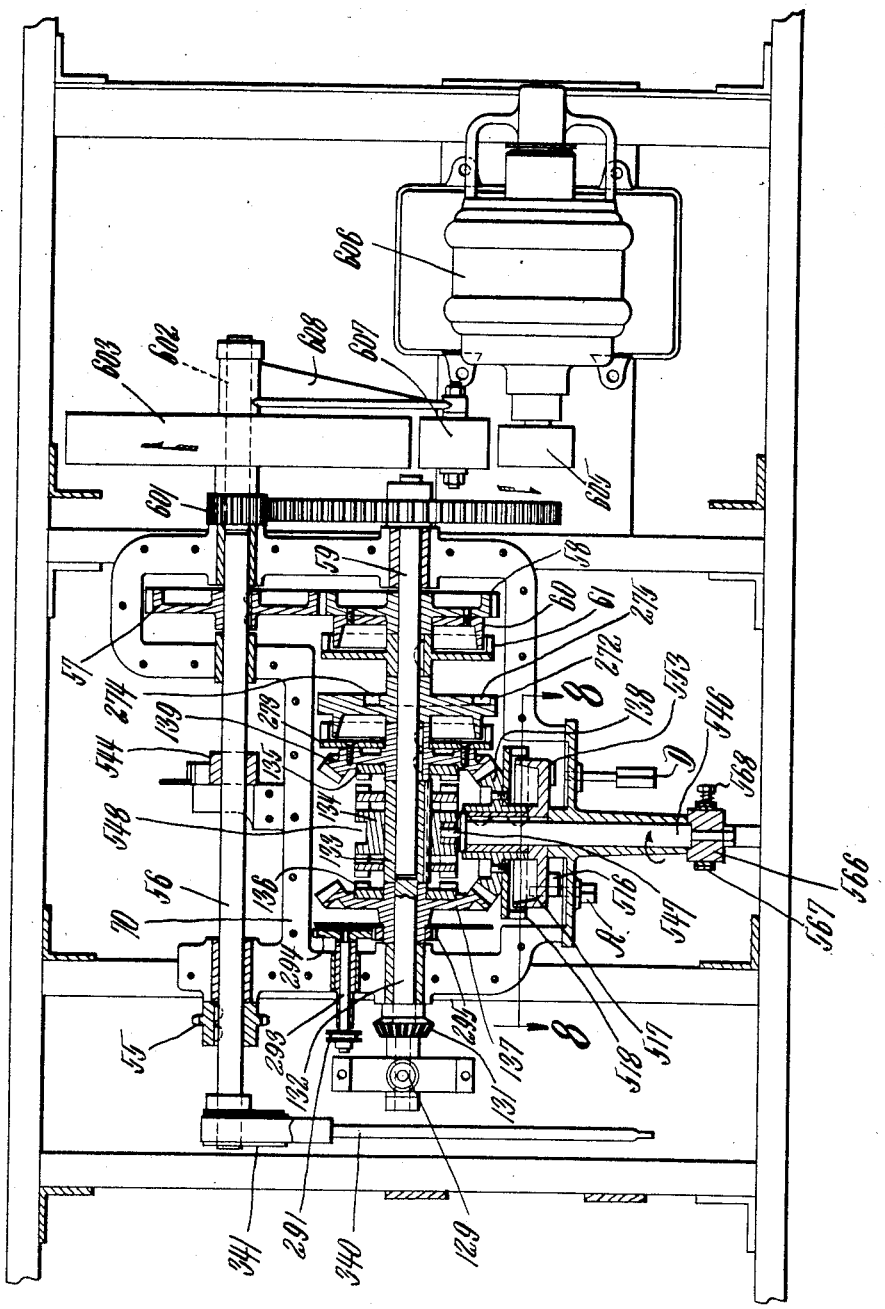

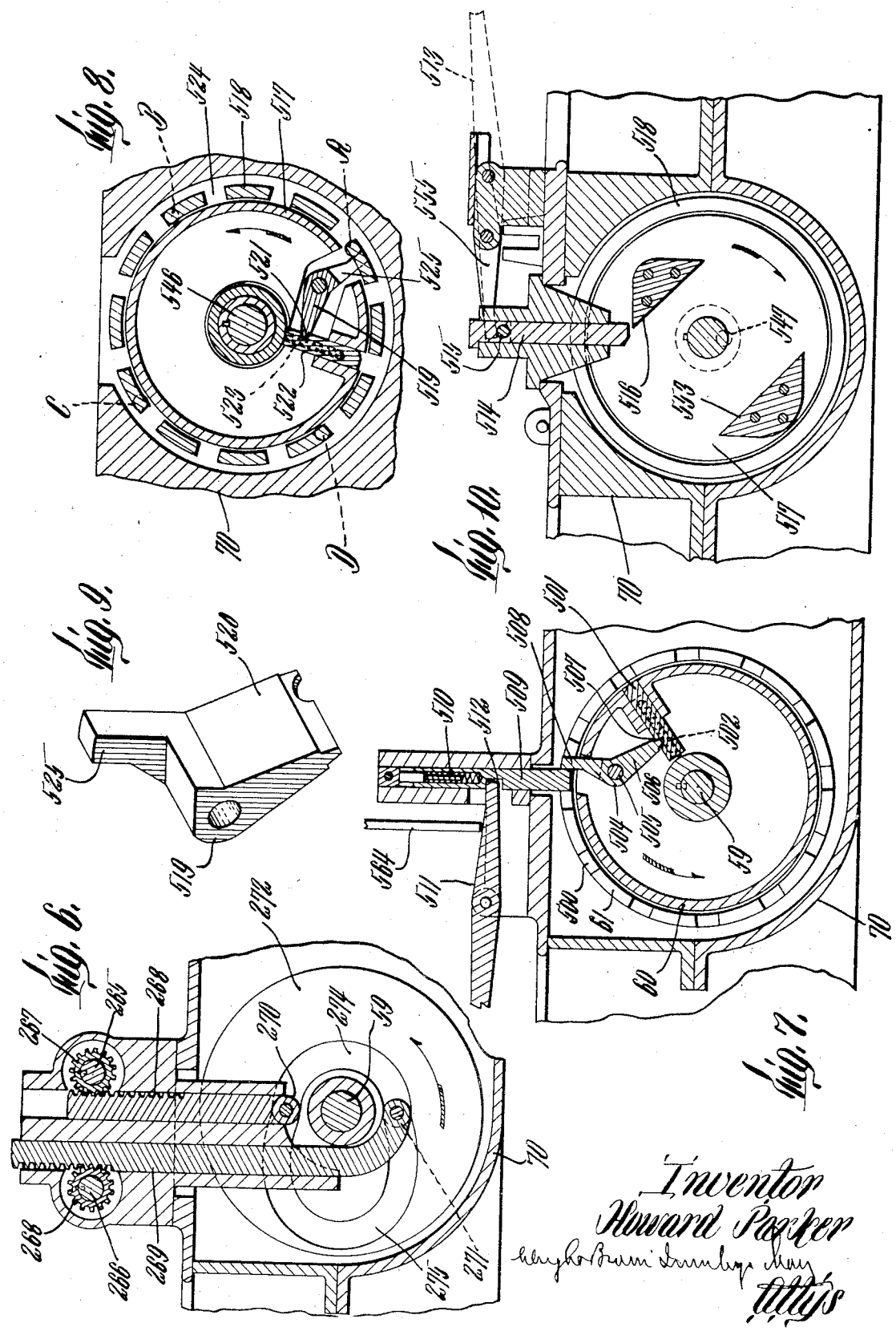

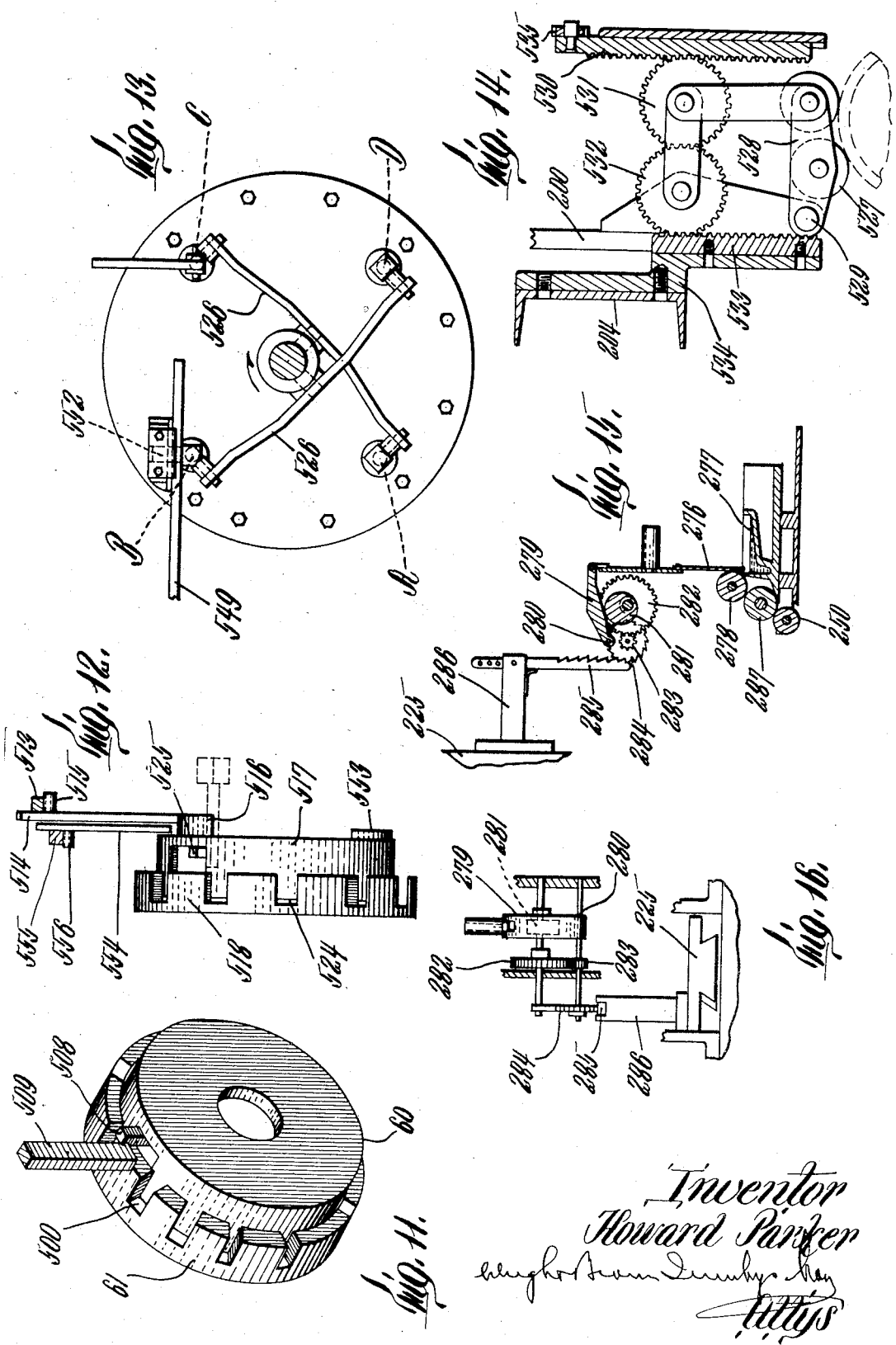

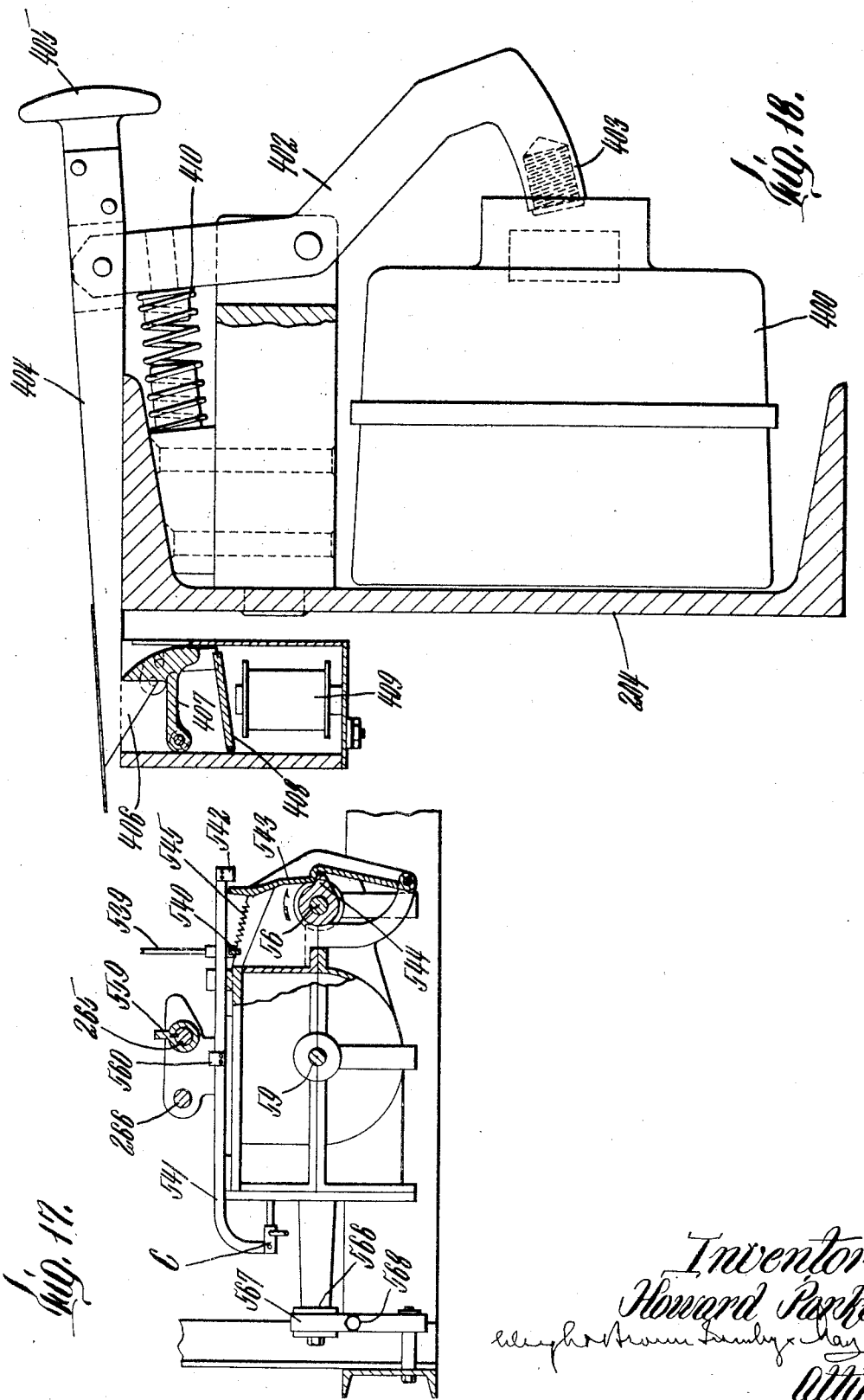

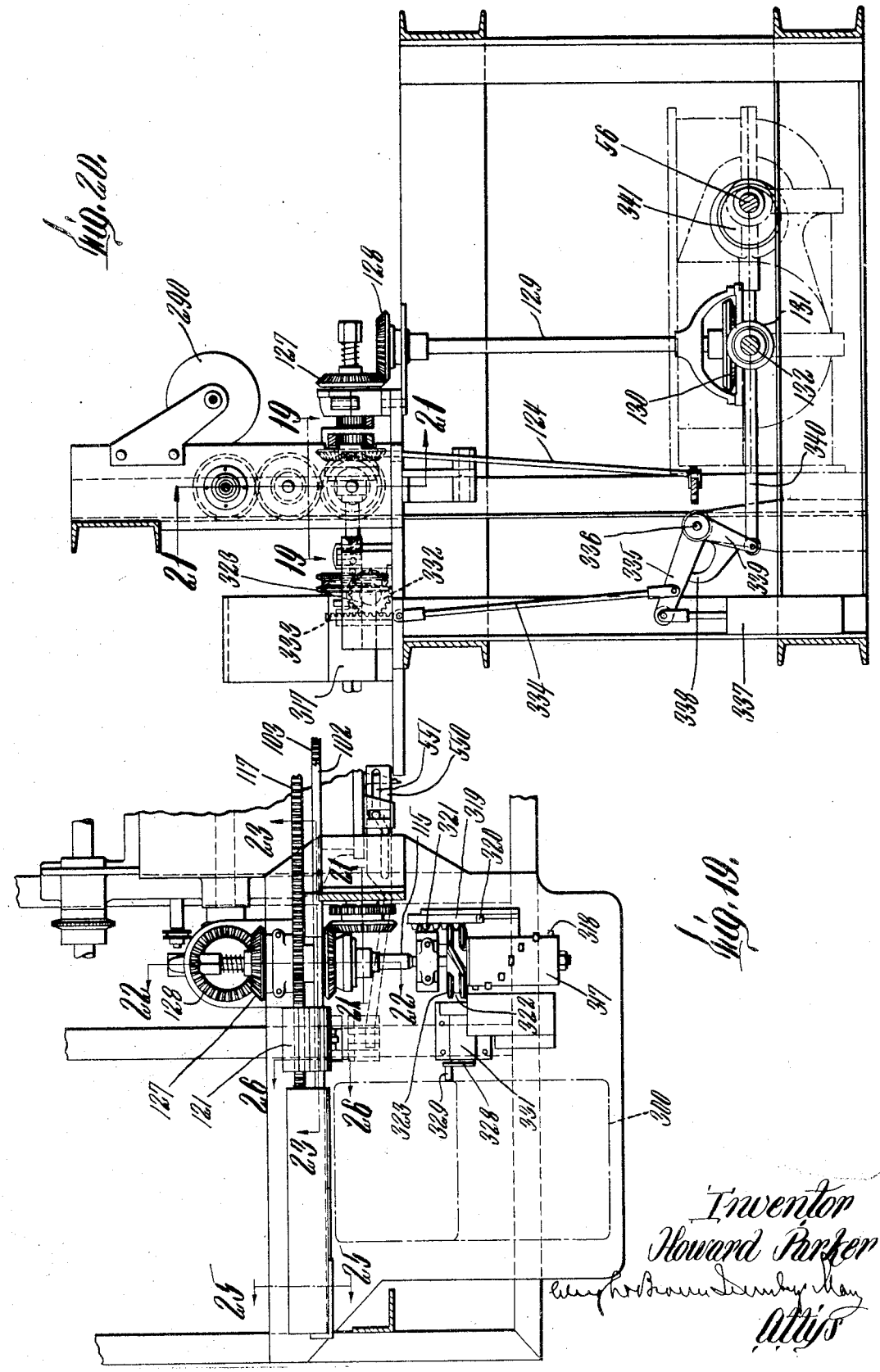

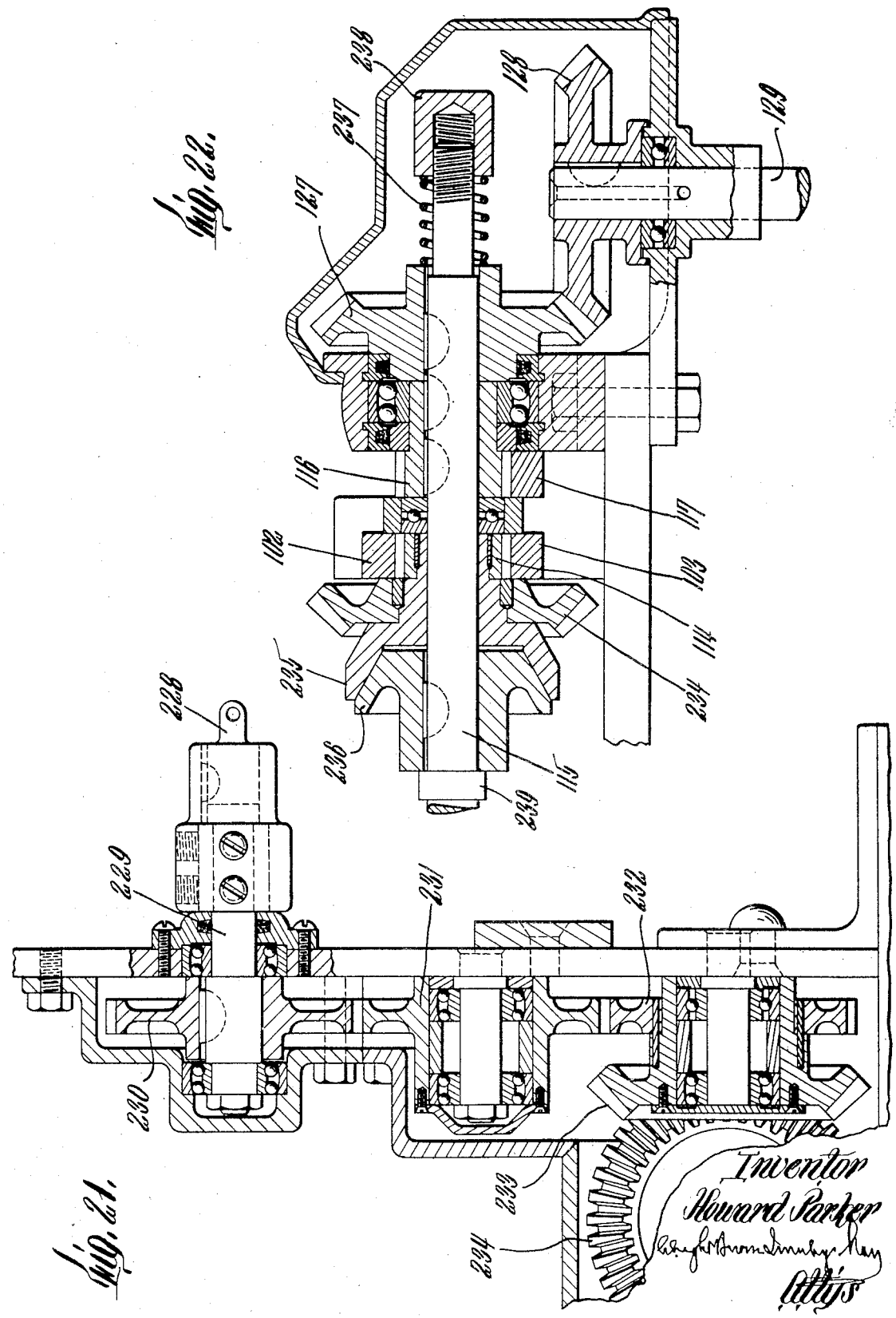

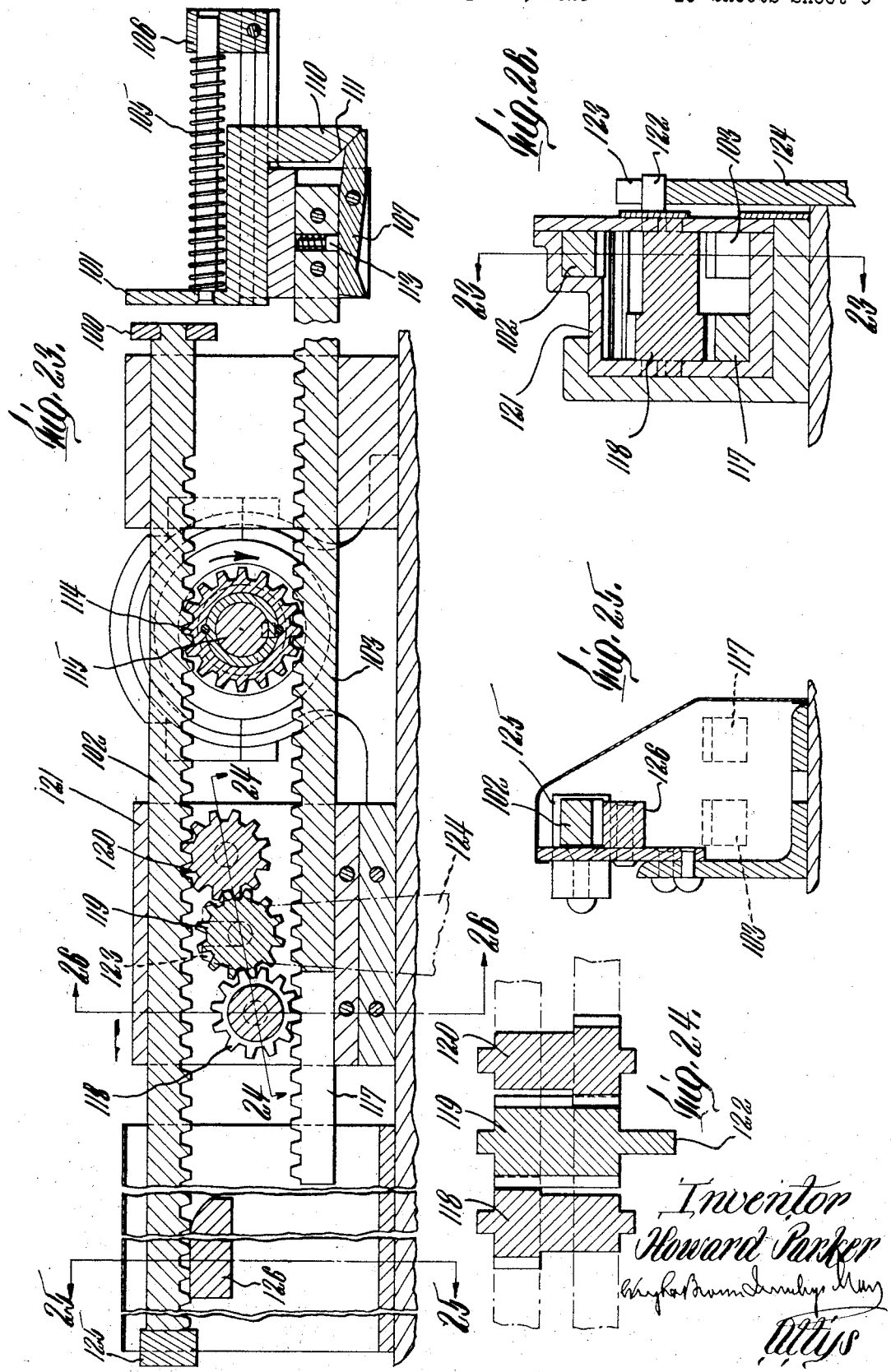

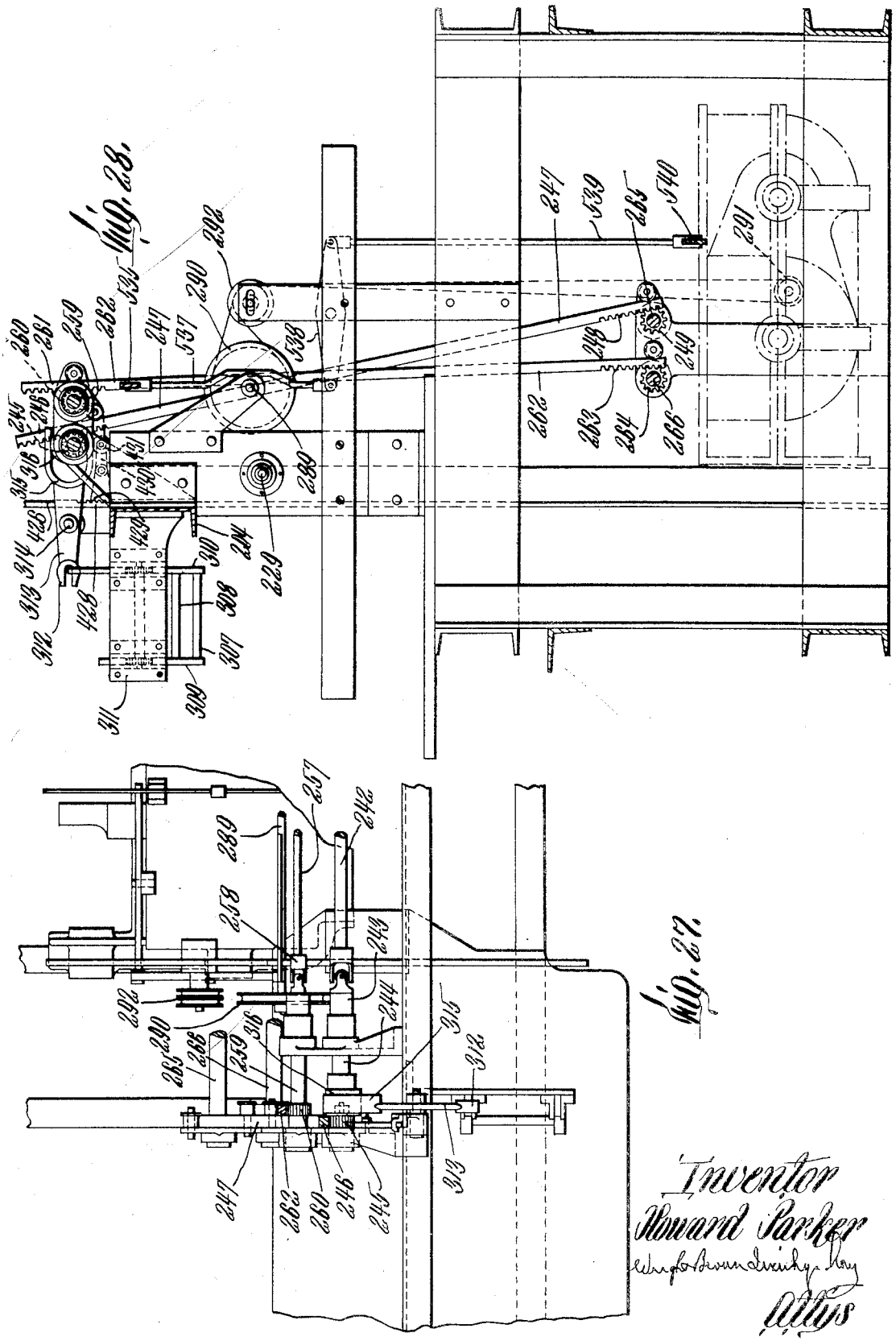

May 16, 1933.  H. PARKER  1,909,888
MECHANISM FOR MEASURING AND COUNTING TUBES OR THE LIKE
Filed Aug. 10, 1929  15 Sheets-Sheet 11
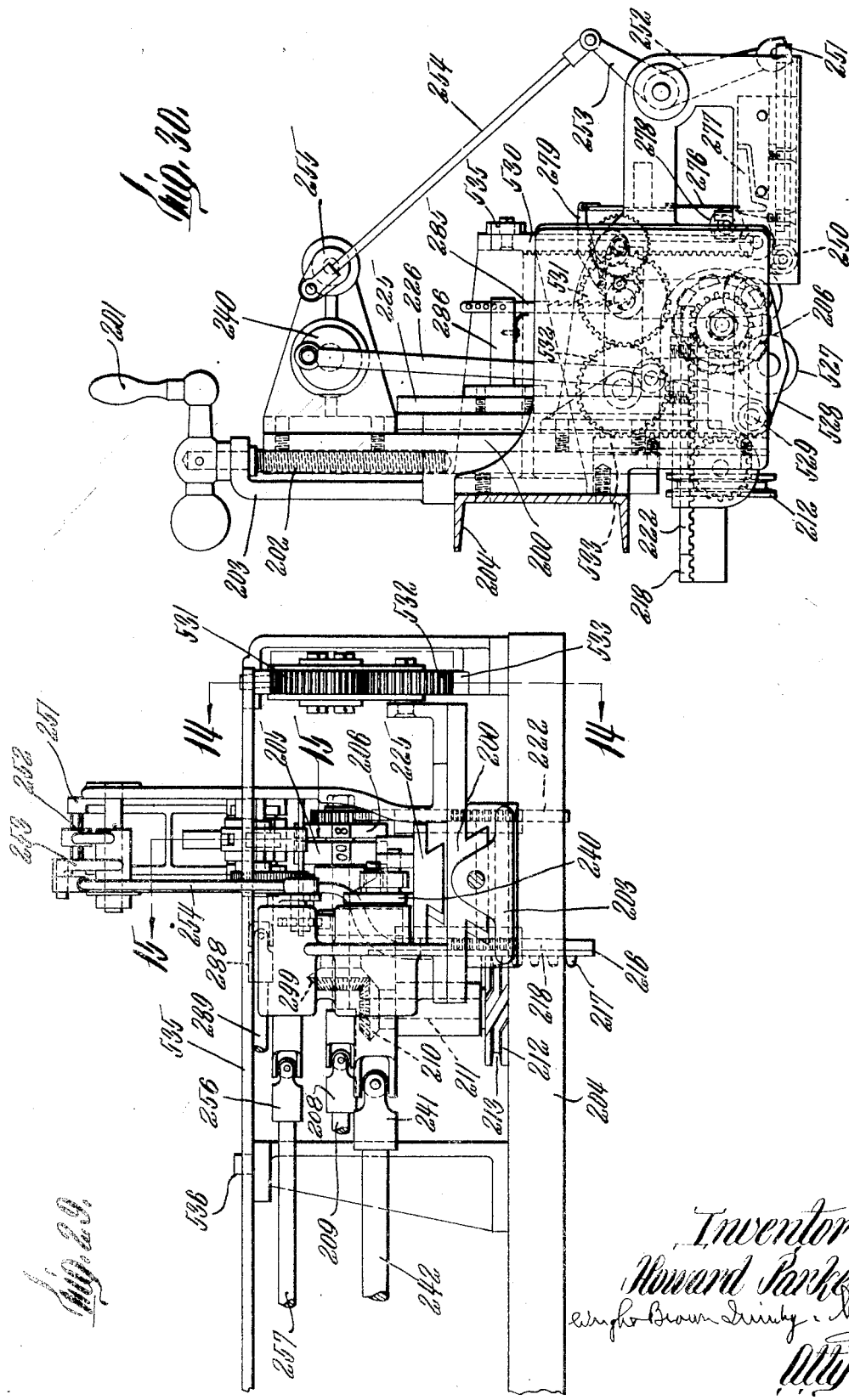

May 16, 1933.  H. PARKER  1,909,888
MECHANISM FOR MEASURING AND COUNTING TUBES OR THE LIKE
Filed Aug. 10, 1929   15 Sheets-Sheet 12
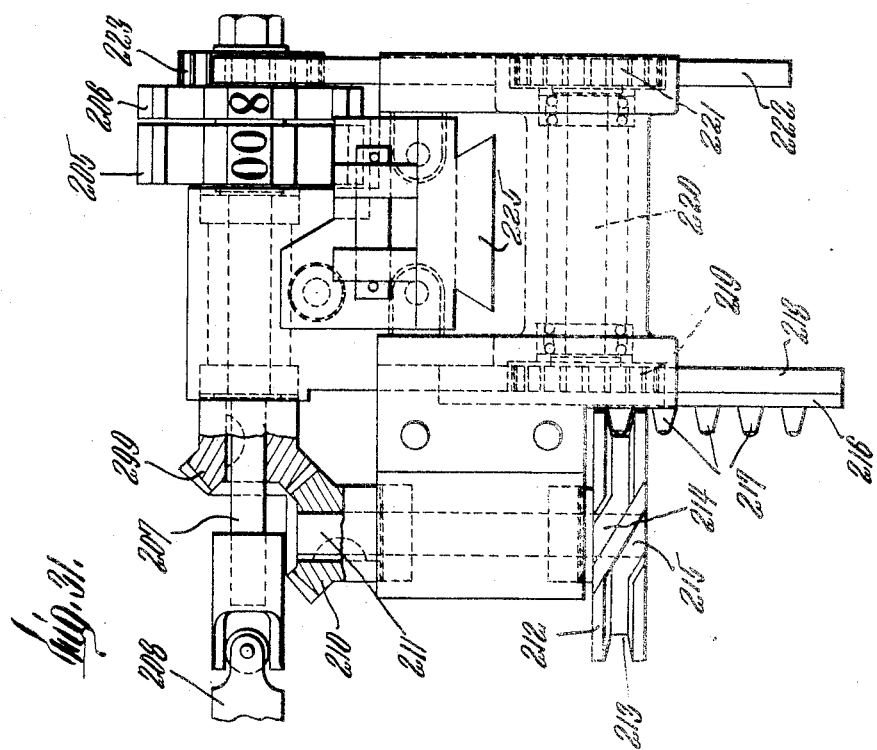
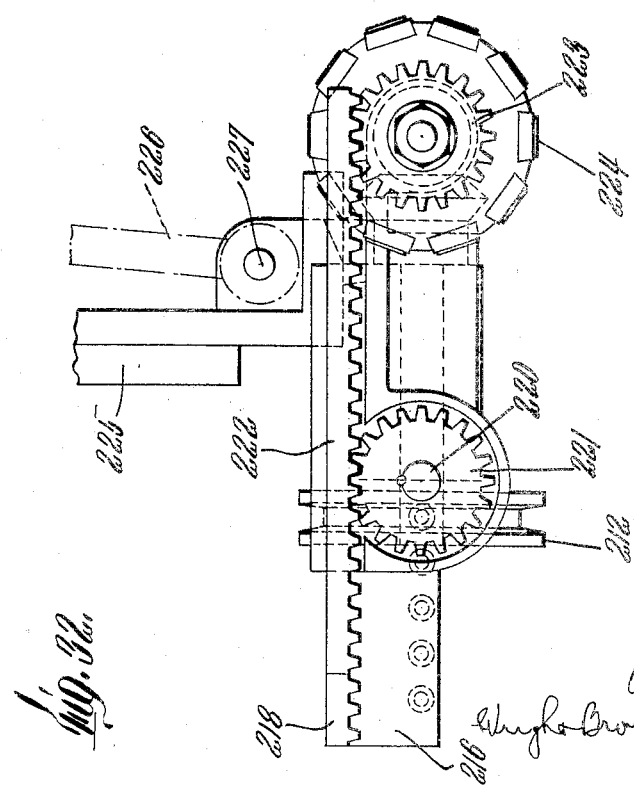
Inventor
Howard Parker

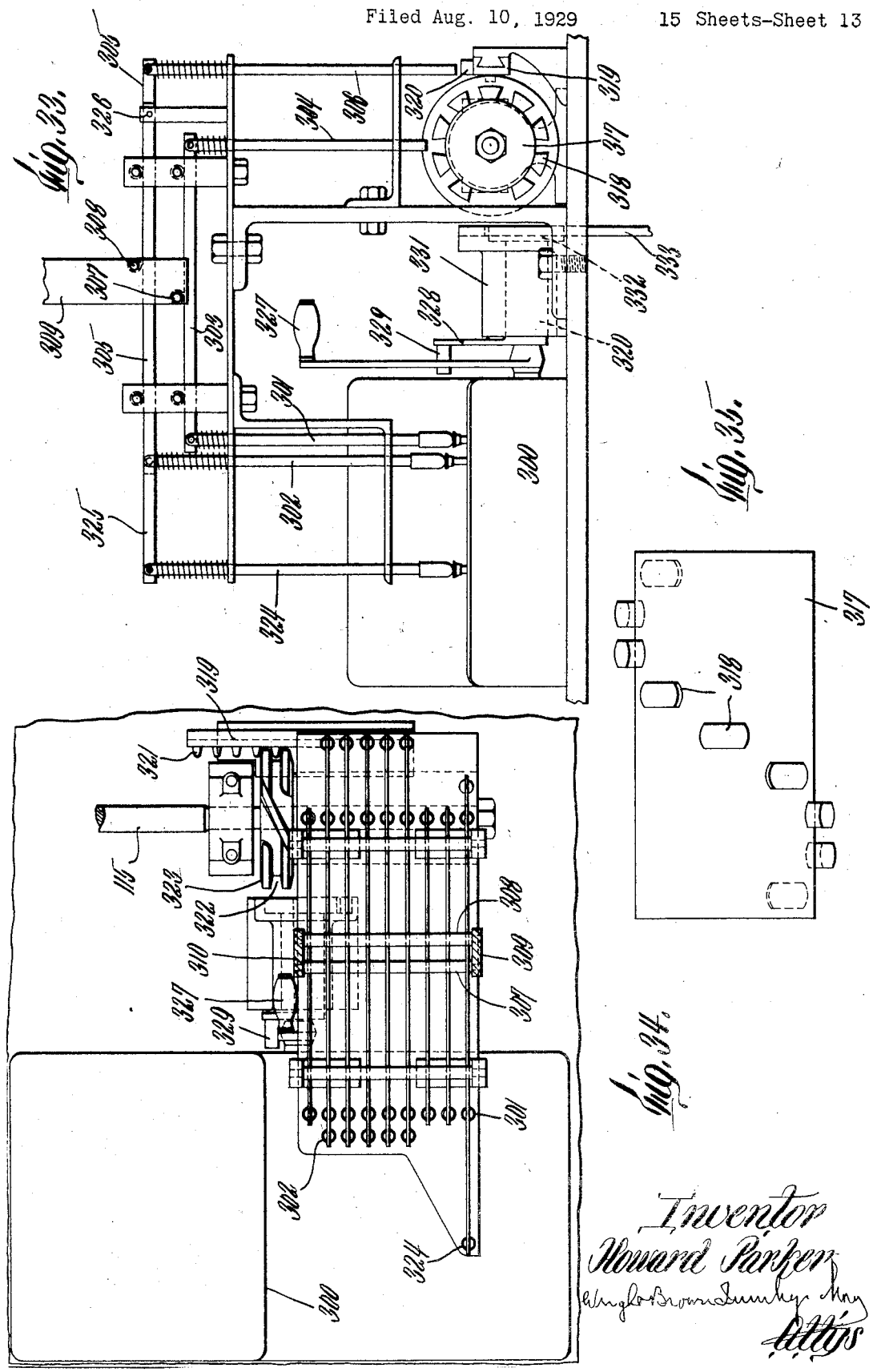

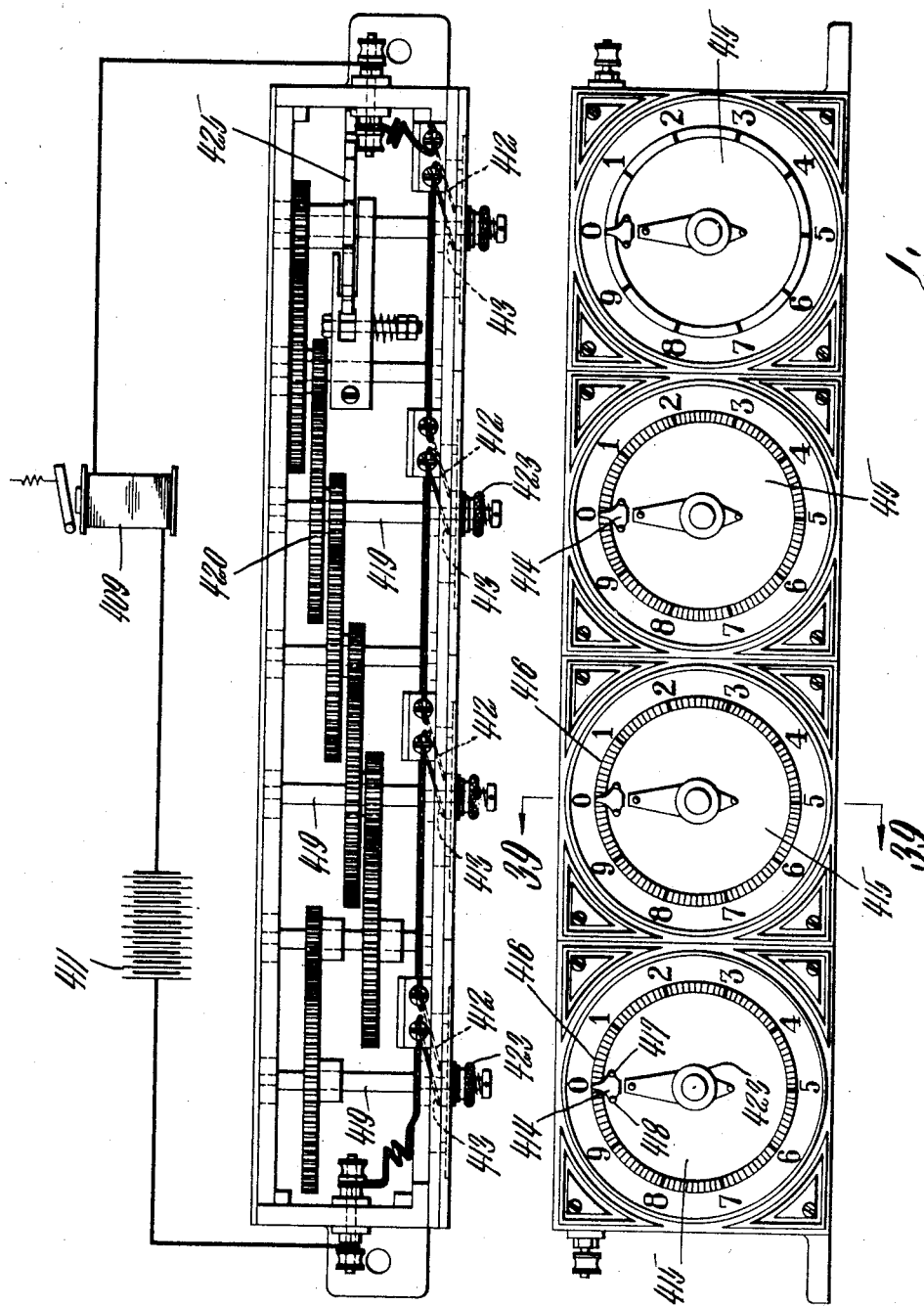

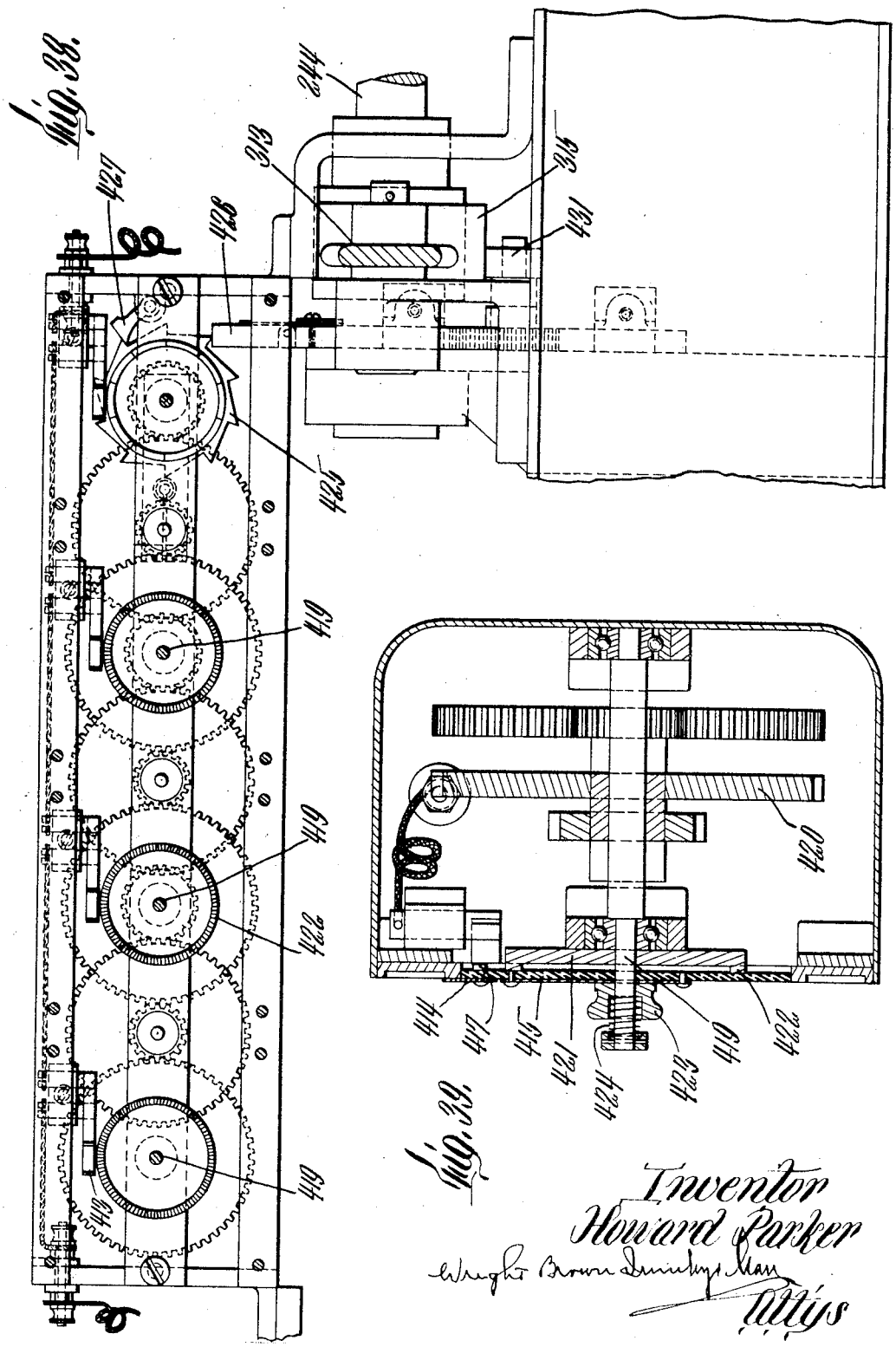

Patented May 16, 1933

1,909,888

UNITED STATES PATENT OFFICE

HOWARD PARKER, OF BERLIN, NEW HAMPSHIRE, ASSIGNOR TO BROWN COMPANY, OF BERLIN, NEW HAMPSHIRE, A CORPORATION OF MAINE

MECHANISM FOR MEASURING AND COUNTING TUBES OR THE LIKE

Application filed August 10, 1929. Serial No. 384,879.

This invention relates to mechanism for automatically measuring the length of articles, such as fiber tubes, which may vary in length but are otherwise substantially uniform, stamping the length of each article thereon, adding up the total length of the articles successively measured, and keeping a tally of the number of articles measured. The mechanism also includes means for automatically stopping the operation when a predetermined number of articles has been measured.

Elongated objects such as fiber tubes are customarily manufactured in standard lengths, this being for convenience of manufacture as well as for convenience of handling when the product is shipped. For example, a certain type of fiber tube is customarily made in eight foot lengths, this being a convenient size suitable for the machinery required for their manufacture. It sometimes happens, however, that a local defect appears on certain of the tubes. If the defect occurs near the end of the tube, this end portion may be cut off, the remainder of the tube being perfect. In laying fiber tubes to form continuous conduits, it is generally immaterial whether or not the individual tubes which are connected together to form a conduit are of a uniform length. When filling a large order calling for a certain total length of tube, the required total may readily be obtained by filling the order with full length tubes and keeping a simple tally of the number of tubes supplied. When, however, tubes of different lengths are supplied for an order, the task of keeping track of the total length of tube supplied has been an arduous one and subject to error. An object of the present invention is to provide mechanism by which tubes of various lengths within certain limits are received in succession, are automatically measured, the measurement being printed on the tube itself, and the total length of the tubes passing through the machine automatically added up. The mechanism, furthermore, keeps a tally of the number of tubes measured.

For a more complete description of apparatus embodying the invention, reference may be had to the following description and to the drawings, of which,—

Figure 1 is a front elevation of mechanism embodying the invention.

Figure 2 is an end elevation of the same looking from the right in Figure 1.

Figure 3 is a detail sectional view of a tube-engaging member.

Figure 4 is a plan view of the lower portion of the mechanism shown in Figures 1 and 2.

Figure 5 is a view similar to Figure 4, but with the cover of the gear box removed and the gearing therein shown in section on a horizontal plane.

Figure 6 is a section on the line 6—6 of Figure 4.

Figure 7 is a section on the line 7—7 of Figure 4.

Figure 8 is a section on the line 8—8 of Figure 5.

Figure 9 is a perspective view of a clutch control element.

Figure 10 is a section on the line 10—10 of Figure 4.

Figure 11 is a perspective view of the clutch illustrated in Figure 7.

Figure 12 is an edge elevation of the clutch illustrated in Figure 10.

Figure 13 is a section on the line 13—13 of Figure 4.

Figure 14 is a section on the line 14—14 of Figure 29.

Figure 15 is a section on the line 15—15 of Figure 29.

Figure 16 is a plan view of the same.

Figure 17 is a section on the line 17—17 of Figure 4.

Figure 18 is a side elevation of a magnetically tripped lever for stopping the machine.

Figure 19 is a section on the line 19—19 of Figure 20.

Figure 20 is a section on the line 20—20 of Figure 1.

Figure 21 is a section on the line 21—21 of Figures 19 and 20.

Figure 22 is a section on the line 22—22 of Figure 19.

Figure 23 is a section on the line 23—23 of Figures 19 and 26.

Figure 24 is a section on the line 24—24 of Figure 23.

Figure 25 is a section on the line 25—25 of Figures 19 and 23.

Figure 26 is a section on the line 26—26 of Figures 19 and 23.

Figure 27 is a fragmentary plan view of a portion of the apparatus for actuating the printing mechanism and adding machine keys.

Figure 28 is an elevation of the same.

Figure 29 is a plan view of the printing head.

Figure 30 is an end elevation of the same.

Figure 31 is a plan view of a portion of the mechanism shown in Figure 29.

Figure 32 is an elevation of the same.

Figure 33 is a front elevation of mechanism for punching keys of an adding machine.

Figure 34 is a plan view of the same.

Figure 35 is a side elevation of a roll shown in Figure 33.

Figure 36 is a plan view of mechanism for counting tubes.

Figure 37 is a front elevation of a panel for the same.

Figure 38 is an elevation of the gearing shown in Figure 36, together with an operating connection.

Figure 39 is a section on the line 39—39 of Figure 37.

Tube conveyor

Referring to Figures 1 and 2, a pair of conveyor chains 50 are shown, each of these conveyor chains passing over a pair of sprocket wheels 51. Each pair of these sprocket wheels is fixed to a shaft 52, one of which also carries a driving sprocket wheel 53 which is operatively connected as by a chain 54 to a sprocket wheel 55 fixed to a drive shaft 56. On this shaft is mounted a gear 57 which meshes with a gear 58, the latter being loosely mounted on a constantly driven shaft 59. To the gear 58 is fixed a clutch 60 which is capable of operative engagement with a clutch member 61 keyed to the shaft 59. As is hereinafter described, the clutch 60 is so constructed as to be automatically disconnected from the clutch member 61 after each single complete revolution has been made. The shafts 56 and 59 may conveniently be journaled in the walls of a closed box 70 which is adapted to house the clutch 60 and other portions of the apparatus to be described to keep such portions lubricated and free from dirt.

The conveyor chains 50 each carry a succession of upstanding tube-supporting members 62, these members having sloping faces as shown in Figure 2 so that successive pairs of these members form a support for a tube, centering the tube between them. The driving connections between the conveyors 50 and the clutch 60 are such that a single revolution of the clutch results in an advance of the conveyors 50 through a distance equal to that between the centers of successive tubes carried by the supports 62. The upper stretches of the conveyors 50 may be suitably supported by the upper edge of suitable rails 63 which form a part of the framework of the apparatus. This framework, which will not be described in detail, consists of sufficient longitudinal and transverse beams and uprights to support the mechanism required and to provide sufficient strength and rigidity to the mechanism as a whole. If desired the apparatus may be made portable by mounting the frame on rollers 64.

Tubes may be supplied to the conveyor by any convenient apparatus or by hand. A pair of guides 65 may be provided to receive the tubes, the supports 62 being adapted to receive the tubes successively from the guides 65 and to feed them laterally as indicated in Figure 2, the tubes after being measured and stamped being discharged from the opposite side of the apparatus.

Tube measuring apparatus

For the measurement of each tube, a pair of feelers 100, 101 are provided, these feelers being adapted to approach the opposite ends of the tube until stopped by contact therewith. The feelers are located in line with and below the stamping head 200 which is hereinafter described in detail. When a tube reaches its measuring position under the stamping head as shown in Figure 2, the feelers 100, 101 are automatically moved toward the ends of the tubes until stopped thereby. To this end the feeler 100 may be mounted at an end of a suitable horizontal rack 102, as shown in Figure 23. The feeler 101 may likewise be mounted at an end of another rack 103. The rack 103 is of sufficient length, as shown in Figure 1, to extend to the end of the apparatus remote from the operating mechanism. It is desirable that when the racks are stopped by contact of the feelers with the ends of the tubes the distance of relative movement of the racks be an exact number of the units by which the tube is measured. This unit may be inches, centimeters, or any other desired unit of length. In the machine illustrated in the drawings the unit used is a tenth of a foot. The remote feeler 101 is mounted on its rack with a limited movement permitted relative thereto, as illustrated in Figure 3, so that if the length of a tube is not an even tenth of a foot, the feeler 101 will yield over the extra fraction to permit the motion of the racks 102, 103 to complete an even tenth. To this end the feeler 101 may be mounted on a suitable carriage 104 which is secured to the remote end of the rack 103. The feeler is normally pressed forwardly by a suitable spring 105 which abuts an upstanding portion 106 of the carriage 104. The carriage 104 is also provided with a pivotal pawl 107 which is adapted to engage any one of a series of teeth 108 formed on a fixed rack 109 which is carried by the frame. The distance between successive teeth 108 is preferably equal to one-half the unit of measurement used for the tubes, in this case the distance being one twentieth of a foot. The feeler 101 is provided with a downwardly extending portion 110 having a beveled face 111 adapted to bear against a corresponding beveled face 112 on the rear end of the pawl 107. When the feeler 101 is free, it is pressed forwardly by the spring 105 so that the face 111 bears on the face 112 and holds the pawl 107 clear of the teeth 108 against the pressure of a suitable spring-pressed plunger 113 carried by the rack 103. As soon as the feeler 101 engages the end of a tube T, it is moved rearwardly with respect to the carriage 104 so that the pawl 107 is allowed to engage the next tooth 108 which it encounters. The mechanism for moving the feelers toward each other is automatically stopped, as is hereinafter described, by their contact with the ends of a tube. By means of the pawl 107, the stopping of the motion of the rack 103 is effected by engagement with one of the teeth 108 rather than directly by actual engagement of the feeler with the end of the tube, so that when motion of the racks is stopped, the relative movement is an even number of units of measurement, in the present instance one-tenth of a foot.

As illustrated in Figures 19 to 23, the feeler racks may be actuated by a suitable pinion 114 which, as shown in Figure 22, is frictionally mounted on a horizontal drive shaft 115. Keyed to the shaft 115 is another pinion 116 which engages a control rack 117, the latter being arranged beside and parallel to the feeler rack 103. When the shaft 115 is rotated clockwise, as shown in Figure 23, the rack 102 is moved toward the right and the rack 103 is moved toward the left, thus causing the feelers 100 and 101 to approach each other until they engage the opposite ends of a tube to be measured. This engagement stops the motion of the two feelers and their racks and thus stops the further rotation of the pinion 114 which thereupon slips on the shaft 115. Continued rotation of the shaft, however, causes further movement of the control rack 117. As shown in Figures 23, 24 and 26, the rack 117 is connected to the rack 102 through a train of gears 118, 119 and 120, which gears are all mounted in a slidable housing 121. As shown particularly in Figure 24, the gear 119 is relatively long so as to intermesh with the gears 118 and 120 which are axially offset in order to mesh with the racks 117 and 102, respectively. From one side of the housing 121 projects a pin 122 which, as shown in Figure 24, may be an extension of an axle of the gear wheel 119. This pin 122 is engaged by the forked end 123 of a vertical lever arm 124 which, as is hereinafter explained in detail, is connected with apparatus for controlling the stopping and reverse movements of the driving mechanism for the feeler racks. This control mechanism is such that when the feeler racks 102 and 103 are moving and keeping in step with the movement of the control rack 117, the housing 121 remains stationary. When, however, the rack 102 is stopped by contact with the end of a tube to be measured, further motion of the control rack 117 rotates the gears 118, 119 and 120 in a manner to cause the housing 121 to slide toward the left as in Figure 23 until the control mechanism stops further rotation of the shaft 115, as hereinafter described. In like manner when the feeler racks are operated in the reverse direction to restore them to their normal positions, the rack 102 may be stopped by the engagement of its rear end with a fixed block 125, whereupon further motion of the control rack 117 moves the slide 121 back to the position shown in Figure 23. This motion of the slide 121 stops further reverse rotation of the drive shaft 115, as will be described. A suitable fixed block 126 may be provided to support the end portion of the rack 102 remote from the feeler 100. As shown in Figures 19, 20 and 22, the shaft 115 may be driven by connection through suitable bevel gears 127, 128 to a vertical shaft 129 which, in turn, is connected by bevel gears 130 and 131 to a drive shaft 132. As shown in Figure 5, the shaft 132 may be provided with an enlarged end portion 133 which is bored to receive loosely an end of the shaft 59. Keyed to the extension 133 is a reversing clutch 134 by which the shaft 132 may be connected to the shaft 59 for direct drive through a clutch member 135 keyed to the shaft 59, or for reverse drive through a clutch member 136 loosely mounted on the shaft 132 and operatively connected to the shaft 59 through a series of bevel gears 137, 138 and 139, the latter being keyed to the shaft 59. Thus the feelers may be operated in either direction or may remain at rest according to the position of the clutch 134.

*Stamping mechanism*

When a tube is in position for measurement, it is located directly beneath the stamping head 200, as shown in Figure 2. This head is vertically slidable, as shown in Figures 29 and 30, and is vertically adjustable by means of a suitable handle 201 mounted to rotate a screw 202 which is in threaded engagement with the stamping head and which is supported by a bracket 203 secured to a horizontal member 204 of the main frame. Operation of the handle 201 raises or lowers the entire stamping head so as to accommodate it to tubes of different diameters. The apparatus carried by the stamping head 200 includes a pair of stamping wheels or rolls for marking each tube with figures to indicate the length thereof and an inking apparatus to ink the stamping rolls.

The marking apparatus consists of marking rolls, mechanism for rotating these rolls so as to put the correct figures in position for engagement with the tube to be marked, and mechanism for thrusting the roll downwardly against the surface of the tube to be marked so as to imprint thereon the desired figures. The marking rolls, as shown in Figure 31, may comprise a roll 205 for printing the tenths of a foot and a second roll 206 for printing the number of whole feet. The roll 205 is keyed to a shaft 207 which, in turn, is connected through a universal joint 208 to a drive shaft 209 by which the rolls are rotated. The shaft 207 is connected by bevel gears 299, 210 to a shaft 211 on which is fixed a wheel 212 having a peripheral channel 213 extending around most of the periphery of the wheel and bending off diagonally to the edges of the wheel as at 214 and 215. A slidable plate 216 is provided with a series of conical pins 217 which are adapted to fit loosely into the chanel 213. As the wheel 212 revolves, sliding motion of the plate 216 is prevented by engagement of a pin 217 in the channel 213 until the pin reaches the diagonal portion 214 or 215, whereupon the plate is slid in one direction or the other as the pin follows the diagonal portion of the channel. As one pin leaves an end of the channel the sliding motion of the plate 216 causes the next adjacent pin 217 to enter the opposite end of the channel. Thus with each revolution of the wheel 212 the plate 216 is advanced a distance equal to that between centers of successive pins 217.

Secured to a face of the plate 216 is a rack 218 which meshes with a gear 219, this gear being mounted on a shaft 220 on the other end of which is mounted a similar gear 221. The latter meshes with a second rack 222 so that the rack 222 is moved equally with the plate 216. The rack 222 also meshes with another gear 223 to which is secured the roll 206, these two elements being loosely mounted on the shaft 207. Rotation of the shaft 207, which takes place during the mutual approaching motion of the feelers 100 and 101, results in the simultaneous rotation of the printing roll 205 and the grooved wheel 212. Each time the roll 205 completes a revolution, the wheel 212 moves the plate 216 along so that the next pin 217 engages in the slot 213. The distance between adjacent pins is such that this motion results in a turning of the printing roll 206 through a sufficient arc to bring the next number into printing position. Since the shorter tubes to be measured involve a greater motion on the part of the feelers, the measuring wheel is set to start at the length of the longest tube which the apparatus is designed to accommodate, the rotation of the printing rolls 205 and 206 being in such a direction as to decrease this figure according to the decrease of distance between the feelers. The stopping of the feeler rods on an even tenth of a foot by the mechanism shown in Figures 3 and 23 and hereinbefore described results in the printing roll 205 stopping with some one of its ten figures in printing position.

As shown in Figure 32 the actual printing is done by means of the raised numerals 224 on the peripheries of the rolls 205 and 206. The printing roll mechanism illustrated in Figures 31 and 32 is secured to a vertical slide 225 and is supported by a rod 226 pivotally mounted to the mechanism as at 227. The slide 225, as shown in Figure 31, may be of dovetail shape to guide the vertical printing movement of the printing mechanism. The slide moves in a suitable vertical groove in a portion of the printing head 200. The shaft 209 by which the printing rolls 205 and 206 are rotated is connected through a second universal joint 228 (Figure 21) to a short shaft 229 on which is mounted a gear wheel 230. This gear wheel is connected through an idle pinion 231 to a gear wheel 232. The latter is mounted on a bevel gear 233 which meshes with another bevel gear 234. As shown in Figure 22, the gear 234 is loosely mounted on the shaft 115 and is frictionally driven thereby through a slip clutch 235 which has an inner conical surface engaging a corresponding friction surface of a clutch member 236 which is keyed to shaft 115. The clutch members 235 and 236 may be held in adjustable frictional engagement as by a spring 237 which engages a cap 238, the latter being threaded on an end of the shaft 115 so as to permit the adjustment of the compression of the spring 237. As shown in Figure 22, the spring 237, pushing against the cap 238, presses the shaft 115 toward the right. The shaft may be provided with a collar 239 to the left of the clutch member 236 so as to press this member against the friction face of the clutch 235. The gear 234 and clutch 235 are fixed to the pinion 114 so that these members revolve as a unit about the shaft 115. The feeler racks and numbering wheels are thus driven from a common clutch 235 which is frictionally connected to the shaft 115. Thus the shaft 115 may continue to turn after the feelers have stopped moving and the printing rolls 205 and 206 have stopped rotating.

The rod 226, by which the printing roll mechanism shown in Figures 31 and 32 is reciprocated vertically to stamp the successive tubes, is actuated by a connection of the rod with a crank wheel 240, this wheel being rotatable through a universal joint 241, a connecting shaft 242 and a second universal joint 243 by a shaft 244 (Figures 1, 27, 28 and 29). To the shaft 244 is fixed a pinion 245 which engages a rack 246 on the upper end of a connecting rod 247. The lower end of this rod has a similar rack 248 which meshes with a pinion 249 through which the stamping mechanism is driven, as will be hereinafter described.

In order to provide for the inking of the printing rolls 205, 206 prior to printing movement, an inking roll 250 may be mounted on a suitable slide 251 (Figure 30). This slide, as shown, may be actuated by a bell crank arm 252, the end of which engages the slide and reciprocates it when the bell crank is rocked. The other arm 253 of the bell crank may be connected as by a link 254 to a crank wheel 255, the latter being connected through a universal joint 256, the connecting shaft 257 and a second universal joint 258 to a shaft 259 (Figures 27, 29). On the shaft 259 is fixed a pinion 260 which meshes with a rack 261 on the upper end of a rod 262. A similar rack 263 on the lower end of the rod meshes with a pinion 264 through which the inking roll 250 is driven.

The printing roll and inking roll may both be reciprocated by a cam wheel illustrated in Figure 6. To this end the pinions 249 and 264 are mounted respectively on shafts 265, 266 (Figures 4, 28). Fixed on these shafts respectively, are pinions 267, 268 (Figure 6) which mesh with a pair of racks 268, 269. The rack 268 carries a cam follower which may be in the form of a roller 270. The rack 269 carries a similar cam follower 271. These cam followers ride in a cam slot cut in the rear face of a clutch 272 which is loosely mounted on the shaft 59 (Figure 5). The clutch 272 cooperates with a clutch member 273 which rotates with the shaft 59 and may for convenience be secured to the gear 139 as shown. The cam slot in which the followers 270, 271 ride comprises a semicircular portion 274 concentric with the shaft 59, and an eccentric portion 275 which forms a closed curve with the portion 274. The normal position of rest of the clutch 272 is illustrated in Figure 6. This corresponds to the positions of the printing wheel and inking roller shown in Figure 30. The clutch 272, as hereinafter described, is adapted when started to rotate one complete revolution and then stop. As may be seen from Figure 6, the first half turn of the clutch 272 results in a single reciprocation, down and up, of the rack 269, the motion being sufficient to rotate the pinion 268, and hence the wheel 255, one half revolution in each direction (Figure 30). This results in a reciprocation of the inking roll 250 across the lowermost numerals of the printing rolls 205, 206, and back to its normal position. The printing rolls are thus inked and are prepared to print. During this motion of the inking roll, the cam follower 270 rides in the semicircular portion 274 of the cam slot, so that the printing rolls 205, 206 are held motionless. During the second half revolution of the clutch 272, the follower 271 rides in the semicircular portion 274 and holds the inking roll stationary, while the follower 270 rides in the eccentric cam portion 275 and reciprocates the rack 268 once, up and down. This results in a half turn of the wheel 240 in each direction so that the printing rolls 205, 206 are reciprocated down and up to stamp the tube being measured and to return to normal position.

Mechanism by which ink may be supplied to the inking roll 250 is illustrated in Figures 15, 16 and 30. A paddle 276 is arranged to dip periodically into a reservoir 277 containing ink and to transfer small quantities of ink to a feed roll 278. The paddle 276 is periodically raised and lowered by an arm 279 pivoted at 280. The under face of the arm 279 is engaged by an eccentric cam 281 mounted on a gear wheel 282 which meshes with a pinion 283. This pinion is carried by a circular ratchet wheel 284 which engages a rack 285. Vertical reciprocation of the rack 285 results in a periodic partial rotation of the ratchet wheel 284 and in a slow reciprocation of the paddle 276 into and out of the reservoir 277. The rack 285 is mounted on an arm 286 which is secured to the slide 225 so that the rack 285 is vertically reciprocated with the printing rolls 205 and 206. The ink which is carried by the paddle 276 from the reservoir 277 to the roll 278 is transferred therefrom to a second feed roll 287. This roll is preferably driven as by operative connection through a universal joint 288 and connecting shaft 289. On the latter may be mounted a pulley wheel 290 through a suitable belt from a pulley 291 (Figure 5). A pair of idle guide pulleys 292 (Figure 27) may be provided to keep the belt clear of other moving parts. The pulley 291 may be mounted on a shaft 293 extending through the wall of the box 70 and constantly rotated by connection with the gear 137 through a pair of gears 294, 295.

The purpose of the various universal joints which have been hereinbefore mentioned is to permit vertical adjustment of the entire stamping head without interfering with the operation of the various mechanisms carried thereby.

*Mechanism for punching adding machine keys*

In order to provide a record of the lengths of the individual sections of tube measured, a tally of the total length of a given shipment of tubes, and a tally of the number of tubes in the shipment, a suitable adding machine 300 may be employed. This adding machine may be of any type suitable for the purpose, no claim being made for this article per se. The operation of an adding machine of the type illustrated consists in depressing suitable keys, this action being followed by the operation of a crank handle to record the figures corresponding to the depressed keys and to add the number expressed thereby to the sum of the preceding numbers. According to the present invention, suitable keys corresponding to the length of each tube measured are depressed by resilient punching plungers as illustrated in Figures 33 and 34. As therein shown, a set of plungers 301 is provided to punch keys representing tenths of a foot. Similar plungers 302 are provided to punch certain keys representing whole feet of length. In the mechanism shown the plungers 302 operate on the numbers 4 to 8 inclusive, but it is understood that this is by way of example only and that the numbers operated upon may be varied as desired to suit the maximum and minimum lengths of tubing which the apparatus is capable of receiving, and measuring. As shown in Figure 33, the plungers 301 may be each connected with a cross arm 303 from the other end of which depends a finger 304. Likewise each of the plungers 302 is connected with a cross arm 305 from which depends a finger 306. The cross arms 303 and 305 are all simultaneously depressed by a pair of bars 307 and 308, these bars being mounted in upright members 309 and 310.

The bars and the upright members are rigidly secured to each other so as to form a unitary framework which is vertically reciprocated on a suitable bracket 311 (Fig. 28). The vertical member 310 has an upwardly extending portion engaged by the jaws 312 of a lever 313 pivotally mounted as at 314. On the end of the lever 313 remote from the jaws 312 is a U-shaped member 315, the arms of which embrace an eccentric 316 fixed to the shaft 244. Rotation of the shaft 244 thus results in a reciprocation of the rods 307 and 308. As the shaft 244 is the one through which the printing rolls are moved to stamp a tube, it is evident that this stamping action of the printing rolls is accomplished simultaneously with a depression of the cross arms 303 and 305.

As shown in Figure 33, the lower ends of the fingers 304 and 306 may be free so that when the cross arms 303 and 305 are depressed, the fingers descend rather than the plungers 301 and 302. If, however, a stop is placed beneath the end of one of each set of fingers, this prevents the descent of such fingers so that the depression of the cross arms 303 and 305 results in a punching action by the corresponding plungers 301 and 302. Mechanism for placing stops under the ends of suitable fingers corresponding to the length of the tube being measured is illustrated in Figures 19 and 20. A suitable drum 317 is provided with a series of upstanding lugs 318, these lugs being axially spaced to correspond to the spacing of the fingers 304. The drum 317 is mounted directly below the row of fingers 304 so that by rotating this drum through certain definite angles, any selected one of the lugs 318 may be positioned directly beneath a corresponding finger 304. As all the other lugs are angularly spaced from the selected lug, none of them will then be directly beneath their corresponding fingers. Hence, when the cross arm 303 is depressed, the selected lug 318 stops the descent of its corresponding finger 304 so that the corresponding plunger 301 is forced downwardly, depressing the key upon which it rests. The drum 317 is mounted on the shaft 115 (Fig. 19) so that as the feelers 100, 101 are advanced to measure a tube, the drum 317 is rotated in step therewith. Allowance is made for the extra rotation of the shaft 115 during the slipping movement of the clutch 235 incident to the release of the control clutch, hereinafter described, to stop further drive of the shaft 115 after the feelers have been stopped by the ends of a tube. The drum 317 is fixed to the shaft 115 in such an angular relation that when the latter is stopped, one of the lugs 318 will be directly beneath its finger 304. Hence the key of the adding machine corresponding to the number of odd tenths of a foot in the length of a tube is depressed when the cross arm 303 is depressed.

The actuation of the next row of adding machine keys for the purpose of recording the number of whole feet in the length of a tube to be measured is accomplished in a similar manner by stopping the descent of the proper finger 306. This is accomplished by the use of a horizontal slide 319 having a single lug 320 upstanding on its upper edge. On a side face of the slide 319 are mounted a number of pins 321 which are adapted to travel in a peripheral groove 322 of a wheel 323 which is mounted on the shaft 115. The wheel 323 is similar in construction to the wheel 212, hereinbefore described, and its cooperation with the pins 321 is as described, that is, at the end of each revolution of the wheel 323 the slide 319 is hitched forward a distance equal to that between centers of successive pins 321. This distance is equal to the distance between successive fingers 306 so that after each revolution of the drum 317 and the wheel 323 the lug 320 is moved from beneath one of the fingers 306 to a position beneath the next successive finger 306. Thus when the cross arm 305 is depressed the lug 320 is beneath the proper finger 306 which corresponds to the number of whole feet in the length of the tube measured. This causes the corresponding finger 306 to press the proper adding machine key to record the number of feet.

In addition to recording and adding the lengths of the individual tubes measured, a tally is kept of the number of tubes measured. This may be done by a single plunger 324 mounted on a cross arm 325 which is pivoted as at 326. This cross arm may be arranged as shown in Figure 33 on a level and parallel with the cross arm 305 so that it is depressed each time the rod 308 is moved downwardly by the rocking of the lever 313. This plunger thus depresses the unit key of a column of the adding machine reserved particularly for a simple tally. When the proper adding machine keys have been depressed, the machine is then ready for recording action by a swing of the operating lever 327. This may be swung as by a crank arm 328 having a pin 329 bearing on a side edge of the lever 327. The crank arm 328 may be attached to a short shaft 330 journaled in a suitable housing 331. On the crank arm 330 may be fixed a suitable pinion 332 arranged to mesh with a vertical rack 333 (Figure 20). This rack is connected with a rod 334 which, in turn, is pivoted to a lever 335 pivoted as at 336. A suitable weight 337 may be attached to the lever 335 for the actual operation of the adding machine lever 327. Thus in case of any trouble with the mechanism of the adding machine so as to cause the adding machine lever 327 to stick, there is no positive drive thereof which might cause serious injury to the adding machine mechanism, the operating force exerted on the lever 327 being limited to that imparted by the action of the weight 337 through the connections described. The weight 337 is held in its upper position when not in operation by a bunter 338 mounted on a lever arm 339 which is pivoted at 336 independently of the lever 335. The lever 339 may be operated through a connecting rod 340 by an eccentric 341 fixed on the shaft 56, which shaft also drives the tube conveyer. Thus the operation of the adding machine lever 327 to record the length of a tube and to clear the adding machine for the next tube is simultaneous with the advance of the conveyer to remove the measured tube from a measuring position and to advance the next successive tube into a measuring position.

*Stopping mechanism*

A stopping mechanism is provided whereby the apparatus may be automatically stopped after a predetermined number of tubes have been measured. This mechanism is arranged to press the stopping button of a switch 400 which is mounted on the beam 204 in a convenient place, as shown in Figure 1, and controls the operation of a suitable electric motor 606 by which the moving mechanism of the entire apparatus may be driven.

The switch 400 may be of a well known type having a pair of buttons, one of which may be pressed to start the motor, the other being pressed to stop it. As shown in Figure 18, I may provide a lever 402 having a finger 403 movable to press against the stopping button of the switch 400. At the upper end of the lever 402 is pivotally connected a latch 404 having an angle piece 405 at one end and a suitable catch 406 at its opposite end. The catch 406 is engageable by a trigger 407 which is arranged to be tripped by the armature 408 of a suitable electromagnet 409. A compression spring 410 may be provided so that when the catch 406 is released the spring 410 may rock the lever 402 so as to cause the finger 403 to press the stopping button and thus to stop the operation of the motor 606. The angle piece 405 may be pushed rearwardly by the operator in order to cause the catch 406 to engage the trigger 407 and to be held thereby during the operation of the apparatus.

Mechanism for energizing the magnet 409 to release the catch 406 and thus to stop the motor 606, is illustrated in Figures 36 to 39. The purpose of this mechanism is to cause the apparatus to cease operation when a predetermined number of tubes have been measured. A plurality of dials may be provided as shown in Figure 37, the right hand dial being adapted to represent units, the next dial tens, etc. Any desired number of dials may thus be used according to the probable number of tubes to be measured in any one lot. As shown in Figure 36, a suitable battery 411 may be provided in series with the electromagnet 409, the circuit having a number of breaks corresponding to the number of dials. At each of these breaks is a pair of contact fingers 412 and 413. Each pair of these contact points may be bridged by a metallic member 414 carried by a rotatable disk 415 which constitutes the central portion of each of the dials. The metal piece 414 may be pointed so as to act as an index to cooperate with suitable scale marks 416 on the fixed annular portion of each dial surrounding the movable disk 415. The disk 415 is made of some suitable insulating material such as bakelite, the member 414 being provided with a pair of contact points 417, 418 which extend through the disk 415 and are suitably spaced for simultaneous contact with the pins 412 and 413 respectively. The latter are so arranged, as shown in Figure 38, as to be in contact with the respective points 417, 418 when the index 414 points at zero mark of its corresponding scale. When the index is in this position the break in the circuit at that particular dial is closed. When the breaks at all the dials are simultaneously closed, the electromagnet 409 is energized to release the catch 406 and cause the motor 606 to stop. The rotatable disks 415 are mounted loosely on a shaft 419 which is driven by a gear wheel 420 fixed thereon. A driving disk 421 is likewise fixed on the shaft 419, this driving disk having a forwardly extending friction flange 422 directly engaging the inner face of the disk 415. The forward face of the flange 422 may be any desired frictional surface or may be formed with teeth as indicated in Figure 38 to cooperate with similar teeth on the inner face of the disk 415. The disk 415 may be provided with a finger piece 423 by which it may be moved outwardly against a spring 424 to clear the teeth of the flange 422 and thus to permit manual rotation of the disk 415 to any desired position. When the spring 424 is then permitted to press the disk 415 against the flange 422, the disk is thereafter driven by rotation of the shaft 419 on which the disk 421 is mounted.

Before starting the operation of the measuring apparatus, the disks 415 of the various dials may be set to the number of tubes which it is desired to measure. If, for example, it is desired to measure 2,000 tubes, the disk of the left hand dial is manually rotated until the index 414 is opposite the scale mark "2" of the dial, the other indexes being left opposite zero. During the operation of the apparatus, the rotatable disk 415 of the units dial is rotated one-tenth of a revolution by a ratchet wheel 425 which is engaged by the upper end of a vertically moving rod 426, a suitable pawl 427 being provided to prevent reverse rotation of the ratchet wheel 425. As shown in Figure 38, the wheel 425 may be provided with ten teeth, a motion of the rod 426 being of sufficient magnitude to advance the wheel one tooth each time the rod is reciprocated. The successive driving shafts 419 for the dials are connected by a train of gears as shown in Figures 36 and 38, these gears being so proportioned that one revolution of the shaft of one dial results in one tenth of a revolution of the shaft of the dial next to it toward the left. The reciprocating rod 426 may be actuated by a mechanism illustrated in Figure 28. A portion of the rod 426 is provided with teeth to form a rack 428 which is engaged by a short arcuate rack 429 on the end of a lever 430. At the opposite end of this lever is mounted a roller 431 arranged to be engaged by a portion of the forked end 315 of the lever 313 which actuates the adding machine key punching mechanism. Thus immediately after the adding machine keys are depressed the rod 426 is moved upwardly against a tooth of the ratchet 425 so as to cause the disk 415 of the right hand dial to rotate one tenth of a revolution. After the dials have been initially set to correspond to the number of tubes to be measured, operation of the measuring apparatus results in a rotation of the disks 415 until the index members 414 are all opposite their respective zero marks. When this occurs, all the breaks in the circuit containing the electromagnet 409 are simultaneously closed so that the magnet is actuated to stop the apparatus.

Control mechanism

The various mechanisms hereinbefore described are all driven in turn from the main drive shaft 59. Suitable control mechanism is provided by which the conveyer, inking roller, stamping head and adding machine may be operated at the proper times, this mechanism being for the most part housed in a casing 70 and including a number of automatic clutches which connect and disconnect the various other mechanisms from the drive shaft 59 at the proper times.

A complete cycle of operations incident to the measuring of a single tube may for convenience be divided into four steps. The first step includes the operation of the tube conveyer by which a tube is conveyed sidewise until it reaches the measuring position. With each advance of the conveyer through a distance equal to that between centers of successive tube supporting members thereof, the adding machine lever is operated so that whenever a tube is moved into measuring position the adding machine is cleared to record the length of the tube coming into position. When the tube reaches the measuring position, as it enters this position it trips mechanism for carrying out the second step. This step includes the simultaneous movement of the two feelers toward the opposite ends of the tube which is in measuring position. The movement of the feelers is accomplished by simultaneous rotation of the printing wheels and actuation of the lug carriers which govern the key-depressing mechanism over the adding machine. These portions of the apparatus keep in step and are all stopped when the feelers are stopped by engagement with the ends of the tube. The stopping of the feelers results in the starting of mechanism to carry out the third step. This step includes the reciprocation of the inking roll under the printing rolls so that the lowermost figures of the printing rolls are inked preparatory to the stamping of figures representing the length of the tube on the wall thereof. The reciprocation of the inking roll is at once followed by a reciprocation of the stamping head down into stamping engagement with the tube and back to its normal position. This motion starts mechanism for carrying out the fourth step which comprises the retraction of the two feelers to their normal position of maximum separation. This retraction of the feelers is accompanied by a reverse rotation of the printing rolls and a return of the lug carriers for the key punching mechanism to their normal position. When the feelers reach their normal positions, mechanism is started for the first step of the next cycle, that is, the conveyer is advanced a unit distance and the lever of the adding machine is operated.

As hereinbefore described, the conveyer is driven through a shaft 56 which is operatively connected to a gear 58. This gear is loosely mounted on the shaft 59 and carries the clutch 60 secured thereto. The clutch member 61 which cooperates with the clutch 60 to disconnect automatically after each single revolution consists of a disk having a flange with a series of notches 500, as shown in Figures 7 and 11. The members 60 and 61 may be operatively connected for simultaneous rotation as by a radially movable plunger 501. This plunger is normally pressed outward by a suitable spring 502 which is carried therein to engage in any one of the slots 500 in the rim of the clutch member 61. When the plunger is so engaged in a slot, the clutch 60 is rotated with the clutch member 61. In order to retract the plunger 501 from engagement with the clutch member 61, I provide a suitable bell crank 504. This bell crank is pivotally mounted as at 505 on a face of the clutch 60. One arm 506 of the bell crank extends into a slot 507 in a side of the plunger 501. The other arm 508 extends outwardly through a gap in the rim of the clutch member 60 alongside the edge of the rim of the clutch member 61 and acts as a bunter to engage the lower portion of a plunger 509 which is normally in its path. The bell crank 504 is similar to that illustrated in Figure 9, except that the bunter arm is at the near side of the bell crank instead of at the further side as shown. When the plunger 509 is in its normal position, illustrated in Figure 7, so as to intercept the bunter 508, the engagement of the latter with the plunger results in the rocking of the bell crank 504 in such a way as to move the plunger 501 inwardly to clear the slots 500. The plunger 509 also serves as a positive stop for the clutch 60, as is evident from Figure 7, so that after each revolution of the clutch 60, the clutch is stopped in exactly the same position each time.

The gearing which connects the clutch 60 with the conveyer is such that when the clutch is in the position illustrated in Figure 7, the conveyer is in such a position that one pair of tube supporting members 62 are centered directly below the measuring position so that if a tube is on this pair of supports, it is stopped exactly in correct measuring position between the feelers. If the clutch 60, 61 is thrown in, a single rotation of the clutch moves the conveyer so that the next pair of supports is stopped in tube-measuring position.

As hereinbefore described, each revolution of the clutch 60 and the shaft 56 geared thereto results in an actuation of the adding machine lever through the eccentric 341.

Controlling mechanism for the clutch 60 is connected as follows: The plunger 509 is moved upwardly against the pressure of a spring 510 by a lever 511 the end of which engages in a lateral recess in the plunger 509. The opposite end of the lever 511 is depressed as by another lever 513 which, as shown in Figure 4, is arranged at right angles to the lever 511. The lever 513 is rocked by the upward movement of a plunger 514 carrying a pin 515 which engages the under edge of the lever 513, as shown in Figure 12. The lower end of the plunger 514 rides on a cam 516 which is mounted on the face of a clutch 517 (Figs. 5, 10 and 12). The clutch 517 is an important element of the control mechanism and cooperates with a clutch member 518 which is secured to the gear 138 and is thus constantly rotated. The clutch 517 during the operation of the apparatus normally advances by successive quarter turns to positions spaced 90° apart, one of these positions being illustrated in Figure 10. When the clutch 517 moves a quarter turn into the position shown in Figure 10, the plunger 514 is momentarily raised by contact with the passing cam 516. This also causes the plunger 509 to be momentarily raised through the rocking levers 513 and 511, so that the conveyer driving clutch 60 is connected to the clutch member 61 for a single revolution.

The movement of the quarter turn clutch 517 is controlled by a series of four pins A, B, C and D, located as indicated in Figure 8. The clutch 517 carries pivotally mounted on a face thereof a bell crank 519 which is similar in structure to the bell crank 504. The bell crank has an arm 520 which engages in a lateral recess 521 in a plunger 522. The plunger is radially movable by a suitable spring 523 to engage in any one of a series of slots 524 in the rim of the clutch member 518. The other arm of the bell crank 519 consists of a bunter 525 which projects from the rim of the clutch 517 and is clear of the rim of the clutch member 518. The bunter 525 is adapted to engage any one of the pins A, B, C or D which may be moved into its path. These pins as shown in Figures 5 and 13 are mounted in a portion of the side wall of the housing 70 and are adapted to be moved in and out to engage or release the bunter 525. The pins A and C are pivotally attached to the ends of a rocking lever 526; the pins B and D are likewise pivotally attached to the ends of another rocking lever 526. Thus when one of the pins is moved out the opposite pin is simultaneously moved in and vice versa. The quarter turns of the clutch 517 are thus controlled by the alternate movements of the pins B and C, these movements resulting in opposite movements of the pins D and A respectively. When the apparatus is ready to be started, the quarter turn clutch is normally in the position illustrated in Figures 8 and 10, the bunter 525 resting against the pin A which is in. A starting lever 570 may be provided to rock the lever 511 so as to release the bunter 508 (Fig. 7) and permit a revolution of the clutch 60 by which the tube conveyor is advanced a unit distance and the adding machine clearing lever is operated. Prior to starting the machine, the operator should see to it that a tube is in position on the conveyor, ready to be moved into measuring position, and that other tubes are ready to be supplied in turn to the carrier 62 of the conveyor. The motion of the tube to be measured into measuring position starts mechanism in operation for carrying out the second step as follows.

The tube in moving into measuring position encounters a roller 527 which rides over the top of the tube (Figs. 2 and 14). The roller 527 is carried on an arm 528 which is pivoted as at 529 to the stamping head 200. Upward motion of the roller 527 as it rides over the top of the advancing tube causes an upward motion of a sliding rack 530 through the action of a pair of pinions 531 and 532 which mesh with each other and also mesh respectively with the rack 530 and a fixed rack 533, the latter being secured by a suitable bracket 534 to the frame member 204. The purpose of the pinions 531 and 532 is to permit the vertical adjustment of the stamping head 200 to accommodate tubes of different diameters. The relation of the pinions and racks is such that vertical adjustment of the head will not result in the elevation or depression of the rack 530. Vertical motion of this rack is thus brought about only by elevation of the roller 527 by contact with a tube entering the measuring position. When the rack 530 is raised, it rocks a lever 535 which is pivotally mounted as at 536 on a fixed bracket (Fig. 29). To the further end of the lever 535 is pivotally attached a rod 537 which is connected through a rock lever 538 with another rod 539 (Fig. 28). The latter is pivoted to an end of a rock lever 540, the other end of which is positioned beneath a control rod 541 which extends horizontally across the top of the casing 70 and which is connected to the pin C (Figs. 4 and 17). The end of the rod 541 remote from its connection with the pin C is provided with a lug 542 which, as shown in Fig. 17, may be in the path of the end of a rock lever 543, but which may be held clear of the lever 543 by the rock lever 540. Whenever the shaft 56, which operates the conveyor, is rotated the lever 543 is swung toward the right (Fig. 17) by a suitable lug 544 mounted on the shaft 56, this motion being against the tension of a suitable spring 545. If no tube is entering the measuring position, the lug 542 is held clear of the lever 543 so that the control rod 541 is not moved. When a tube is entering the measuring position, the rise of the roller 527 as it rides over the tube results in the lowering of the end of the lever 540 which normally holds the lug 542 clear of the lever 543. When thus lowered, the lug 542 is engaged and moved toward the right (Fig. 17) by the lever 543 as the shaft 56 rotates, thus moving the pin C inwardly. As is evident from Figure 13, the inward motion of the pin C results in the outward motion of the pin A, thus releasing the bunter 525 which is against the pin A during the operation of the conveyor. At this time the pin B is in, having been moved in previously in order to release the bunter from the pin D and allow it to move into contact with the pin A. When the bunter is released by the pin A, it is therefore stopped, after a quarter turn, by engagement with the pin B.

The clutch 517 is keyed to a shaft 546 on the inner end of which is mounted a crank pin 547 (Figs. 5 and 10). This crank pin engages in a peripheral slot 548 in the clutch 134 so that this clutch is controlled by the angular position of the shaft 546. When the quarter turn clutch 517 is in the position illustrated in Figs. 8 and 10, the clutch 134 is in neutral so that there is no motion of the feelers. The quarter turn of the shaft 546 as the bunter 525 moves from pin A to pin B causes the clutch 134 to engage with the clutch member 136 and thus operatively connects the shaft 115 with the shaft 59. As hereinbefore described, the shaft 115 simultaneously operates the feeler racks 102, 103, rotates the numbering rolls 205, 206, and rotates the lug drum 317 for the key punching mechanism. When the feelers are stopped by engagement with the ends of the tube to be measured, the control rack 117 continues to move so that the slide 121 (Fig. 23) is moved toward the left, rocking the lever 124. The lower end of the lever 124 is connected to a horizontal bar 549 (Figs. 1 and 4). This bar has a widened portion 550 in which is cut a cam slot 551. A cam follower 552 which rides in this slot is rigidly attached to the pin B (Fig. 13). The motion of the upper end of the lever 124 toward the left results in movement of the lower end of the lever 124 and of the bar 549 which is attached thereto toward the right. Such motion results in a movement of the pin B outward, as is evident from the shape of the cam slot 551 shown in Figures 2 and 19. Thus the continued motion of the control rack 117 after the feeler racks have been stopped by the ends of the tube results in the outward movement of the pin B to release the bunter 525 and thus to cause rotation of the clutch 517 and the shaft 546 on which the clutch is fixed. The clutch 517 is stopped after a quarter turn by the engagement of the bunter 525 with the pin C which was moved inwardly when the pin A was moved out to allow the bunter to swing to the pin B. The quarter turn from B to C shifts the clutch 134 into neutral, thus stopping further rotation of the shaft 115. The stopping of the shaft 115 also stops the rotation of the numbering rolls 205, 206 and the lug drum 317. Besides shifting the clutch 134 into neutral, the quarter turn from B to C also moves the cam block 553 past the rod 554 (Figs. 10 and 12). The cam block 553, which is mounted diametrically opposite to the cam block 516, is nearer to the periphery of the clutch disk 517 than is the cam block 516. The cam block 553 also projects a shorter distance from the face of the disk so that the two cam blocks thus operate their respective rods 554 and 514 without mutual interference. When the cam block 553 moves past the rod 554 the latter is momentarily elevated, carrying with it an end of a rocking lever 555 which is engaged by a pin 556 mounted on the rod 554. The lever 555 is pivotally mounted near its center so that as one end is raised by the rod 554, the opposite end is depressed. The latter bears on an end of another rocking lever 557 arranged at right angles to the lever 555 (Fig. 4). The depression of this end of the lever 557 results in the elevation of the opposite end which engages a vertical plunger 558 so as to raise the latter. The plunger 558 operates to connect for a single revolution the clutch members 272, 273 in precisely the same manner as the plunger 509 (Fig. 11) operates to connect the clutch members 60, 61, the member 272 being provided with a radially movable pin engageable in any one of a series of peripheral slots in the flange of the member 273. As shown in Figure 6, one face of the clutch 272 is provided with a cam slot 274, 275 as previously described. As the clutch disk 272 rotates with the shaft 59, it is evident that the first half of the rotation results in a reciprocation of the cam follower 271 down and then up, the cam follower 270 meanwhile remaining stationary. The second half turn of the clutch disk 272 results in a reciprocation up and down of the cam follower 270 while the cam follower 271 remains stationary. As previously described, these motions result in the operation of the ink roll to apply ink to the printing rolls, then the reciprocation of the stamping head to move the printing rolls to print on the side of the tube being measured and then to return to their normal position. As previously described, the opeartion of the stamping head results in the simultaneous operation of the mechanism for depressing the selected keys of the adding machine which correspond to the length of the tube being measured. In addition to these results, the rotation of the shaft 265 accompanying the rise of the cam follower 270 swings a bunter 559 (Figure 17) through an arc of about 180° to strike a lug 560 which is mounted on the cross bar 541 in such a position as to cause the bar to be moved toward the left so as to move the pin C out and the pin A in. This takes place when the clutch disk 272 has made three quarters of a turn. The movement of the pin C to its outward position releases the quarter turn clutch member 517 so that the bunter 525 moves from the pin C to the pin D. This completes the third step.

The quarter turn of the clutch disk 517 from C to D inaugurates the fourth step of the cycle of operations by connecting the clutch 134 in reverse. This results in reverse rotation of the shaft 115 and the return of the feeler and control racks to their normal position of rest. Simultaneously with the movement of the racks the numbering rolls 205 and 206 are rotated in reverse to their normal position and the lug carriers for the operation of the adding machine key punchers likewise are returned to normal position. When the feelers reach their normal position of maximum separation, the rack 102 is stopped by engagement with the fixed block 125 (Figure 23). The continued motion of the control rack 117 thereupon moves the slide 121 toward the right and rocks the lever 124. This, in turn, shifts the bar 549 toward the left (Figure 4) and thus moves the pin B inwardly and the pin D outwardly. The clutch 517 is thus connected for another quarter turn to the pin A, moving the cam block 516 past the rod 514 and connecting the clutch 60, 61 to drive the conveyor mechanism another unit distance so that the tube which has been measured is moved out of measuring position and is replaced by the next successive tube to be measured. The motion of the conveyor is accompanied by the operation of the adding machine lever 327, this lever being operatively connected with the shaft 56 by mechanism hereinbefore described. The adding machine is thus cleared for the next successive tube. If the next tube supports 62 of the conveyor have no tube thereon, the mechanism stops operation after the clutch 60 completes its revolution since there is nothing to raise the roller 527 and lower the lug 542 (Fig. 17) to start the second step of the cycle. The clutch 60 may then be connected for another revolution by rocking the hand lever 570. If, however, the next tube supports of the conveyor have a tube thereon, the roller 527 is raised by contact with the tube, the pin A is moved in, and the cycle is continued as described.

Since accidental advance of the conveyor while the measuring mechanism is being operated might result in serious injury to the apparatus, the clutch 60, 61 is automatically locked whenever the feelers move from their normal position of rest. This may be done by a suitable lever 561 (Fig. 1) pivotally mounted on a fixed bracket 562. A suitable spring 563 may be employed to hold the lever yieldingly in the positions shown in Figure 1, the lower end 564 of the lever being immediately above and substantially in contact with the end portion of the rocking lever 511 which is adjacent to the plunger 509 (Fig. 7). The upper end portion 565 of the lever 561 is located in line with the control rack 117 so that when this rack is moved to its normal position of rest, it engages the end 565 and moves the lower end 564 clear of the lever 511. The plunger 509 can then be raised to start the operation of the conveyor. When the control rack 117 is moved from its position of rest with the feeler racks, it permits the spring 563 to rock the end 564 into locking position so that the conveyor cannot then be operated until the racks have been retracted.

When the clutch 517 is being stopped by a pin after each quarter turn, the bell crank 519 is rocked against the pressure of the spring 523 to retract the plunger 522. The spring 523 thus tends to rock the bell-crank in the opposite directions which would result in a slight rotation of the clutch 517 in the reverse direction. To prevent such reverse rotation, the shaft 546, to which the clutch 517 is keyed, is provided with a brake drum 566 which is embraced by a pair of arcuate brake shoes 567. The pressure of the shoes on the periphery of the drum may be regulated as by a bolt 568 arranged to draw the shoes together in clamping engagement with the drum. The brake is preferably adjusted to produce a drag on the shaft 546 sufficient to prevent reverse rotation thereof from any of its positions of dwell.

The main shaft 59 may be connected as desired to any suitable source of power. As shown, the shaft carries a gear wheel 600 which meshes with a pinion 601 mounted on a shaft 602. A large belt pulley 603 is also mounted on the shaft 602 and is connected as by a belt 604 with a pulley 605 mounted on the shaft of a motor 606. The belt may be kept taut by a floating pulley 607 carried by a swinging arm 608 in a manner well known in the art.

I claim:

1. Apparatus of the class described comprising a pair of feelers having normal spaced-apart positions, means for moving said feelers toward each other from said positions until the feelers are stopped, means for recording the distance between the feelers when stopped, means responsive to the stoppage of the feelers for actuating the recording means and means responsive to said recorder actuating means for returning said feelers to their normal positions.

2. Apparatus of the class described comprising a pair of feelers having normal spaced positions, means for holding an object to be measured in a predetermined position between said feelers, means for simultaneously advancing said feelers to engage and to be stopped by said object, a reciprocable stamping head above said position, a numbering roll carried by said stamping head, means for rotating said numbering roll in accordance with the change of distance between the advancing feelers, means responsive to the stopping of said feelers for reciprocating said stamping head and roll to stamp said object, and means responsive to said reciprocating means for returning said feelers to their normal positions.

3. Apparatus of the class described comprising a pair of feelers having normally spaced positions, means for supporting a tube to be measured between said feelers and in line therewith, means for feeding a tube into position to be measured, means responsive to the movement of a tube into measuring position for moving said feelers toward each other so as to engage and be stopped by the ends of said tube, means responsive to the stopping of said feelers for depressing keys of a suitably positioned adding machine corresponding to the distance between the stopped feelers, means for automatically returning the feelers to their normally spaced positions, and means responsive to the arrival of said feelers at their normal positions for simultaneously feeding said tube from the measuring position and operating the clearing lever of said adding machine.

4. In an apparatus for measuring tubes and having a step-by-step conveyor for tubes, mechanism comprising a pair of feelers having normally spaced positions, means for operating the feelers to measure a tube in line therewith, and means engageable by a tube moving into position between said feelers for starting the operation of said operating means.

5. In an apparatus including a conveyor and means for measuring tubes and the like, mechanism comprising a pair of feelers having normally spaced positions, means for imparting intermittent movement to said conveyor to advance tubes thereon successively into line with said feelers for measuring, means for operating the feelers to measure a tube in line therewith, means engageable by a tube moving into position between said feelers for starting the operation of said operating means, and means for preventing advance of the conveyor during the operation of said feelers.

6. Mechanism of the class described comprising a drive shaft, a pinion frictionally mounted on said shaft, a second pinion fixed on said shaft, a pair of parallel measuring racks meshing with said frictionally mounted pinion at diametrically opposite points, normally spaced feelers carried by said racks and movable toward each other, means for supporting an object to be measured between said feelers whereby approaching movement of said feelers is stopped by engagement of the feelers with the object to be measured, driving means, a clutch operable to connect said drive shaft to said driving means, and means actuated by continued rotation of said drive shaft after the feeler racks are stopped for operating said clutch to disconnect said shaft from said driving means.

7. Mechanism of the class described comprising a drive shaft, a pinion frictionally mounted on said shaft, a second pinion fixed on said shaft, a pair of parallel measuring racks meshing with said frictionally mounted pinion at diametrically opposite points, normally spaced feelers carried by said racks and movable toward or away from each other by rotation of said frictionally mounted pinion, a control rack meshing with said fixed pinion, a gear train having gears meshing with said control rack and one of said measuring racks, a carriage supporting said gear train and movable by continued motion of said control rack after said measuring racks are stopped, driving means, a reversible clutch capable of connecting said drive shaft with said driving means for rotation in either direction, and means responsive to motion of said carriage for operating said clutch to disconnect said shaft from said driving means.

8. Mechanism of the class described comprising a pair of parallel rods, means for moving said rods axially in opposite directions, a friction connection between said rod and said moving means, a feeler carried by each said rod, said feelers being normally spaced, means for supporting an object to be measured between said feelers so as to be engaged by said feelers when said rods are actuated to move said feelers toward each other, a fixed rack with uniformly spaced teeth, a pawl carried by one of said rods and normally held clear of said rack, means including a yielding connection between said one rod and its feeler for releasing said pawl for engagement with said rack when its feeler is stopped by engagement with an object to be measured whereby said one rod is stopped by engagement of the released pawl with the next tooth of the fixed rack.

9. In apparatus including means for conveying sidewise a tube to be measured to a position for measuring, means for automatically measuring a tube in said position, means for controlling the operation of said measuring means, said controlling means including a member positioned to be engaged by a tube moving into the measuring position and to be moved upwardly thereby, and means actuable by said upward movement of said member for starting the operation of said measuring means.

10. Apparatus for measuring and marking tubes and the like, comprising means for positioning successive tubes for measurement, means for stamping on the positioned tube a mark to indicate its length, driving means for said positioning means and stamping means, and control means automatically responsive to the completion of a positioning movement of a tube to stop said positioning means and start said stamping means by connection or disconnection with said driving means.

11. Apparatus for measuring and marking tubes and the like, comprising means for positioning successive tubes for measurement, means for stamping on the positioned tube a mark to indicate its length, driving means for said positioning means and stamping means, and control means for starting and stopping said positioning means and stamping means by connection to and disconnection from said driving means, said control means being automatically responsive to the completion of a positioning movement of a tube to stop the positioning means and start the stamping means, and automatically responsive to a completion of the operation of the stamping means to stop said stamping means and start said positioning means whereby the marked tube is displaced by another tube.

12. Apparatus for counting and measuring tubes and the like, comprising means for positioning successive tubes for measurement, means for indicating the sum of the measurements and the tally of the tubes measured, driving means for the other said means, and control means automatically responsive to the completion of a positioning movement of a tube to disconnect said positioning means from said driving means and to operatively connect said indicating means to said driving means.

In testimony whereof I have affixed my signature.

HOWARD PARKER.